United States Patent
Qian et al.

(10) Patent No.: US 12,548,195 B2
(45) Date of Patent: Feb. 10, 2026

(54) METHOD FOR DETERMINING CHROMATICITY INFORMATION AND RELATED ELECTRONIC DEVICE

(71) Applicant: Honor Device Co., Ltd., Shenzhen (CN)

(72) Inventors: Yanlin Qian, Shenzhen (CN); Dongmiao Xi, Shenzhen (CN); Meng Jin, Shenzhen (CN); Zirong Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 473 days.

(21) Appl. No.: 18/042,274

(22) PCT Filed: May 10, 2022

(86) PCT No.: PCT/CN2022/091965
§ 371 (c)(1),
(2) Date: Feb. 20, 2023

(87) PCT Pub. No.: WO2023/015993
PCT Pub. Date: Feb. 16, 2023

(65) Prior Publication Data
US 2023/0342977 A1 Oct. 26, 2023

(30) Foreign Application Priority Data
Aug. 12, 2021 (CN) .......................... 202110925200.8

(51) Int. Cl.
*G06T 7/90* (2017.01)
*H04N 9/73* (2023.01)

(52) U.S. Cl.
CPC ................. *G06T 7/90* (2017.01); *H04N 9/73* (2013.01); *G06T 2207/10024* (2013.01); *G06T 2207/20224* (2013.01)

(58) Field of Classification Search
CPC ............. G06T 7/90; G06T 2207/10024; G06T 2207/20224; H04N 9/73; H04N 23/88
See application file for complete search history.

(56) References Cited

U.S. PATENT DOCUMENTS

| 10,630,954 B2 | 4/2020 | Krestyannikov et al. |
| 2013/0083216 A1 | 4/2013 | Jiang et al. |
| 2013/0093915 A1* | 4/2013 | Zhang .................... H04N 23/10 382/167 |

(Continued)

FOREIGN PATENT DOCUMENTS

| CN | 109982059 A | 7/2019 |
| CN | 111551266 A | 8/2020 |

(Continued)

*Primary Examiner* — Christopher Wait
(74) *Attorney, Agent, or Firm* — Conley Rose, P.C.

(57) ABSTRACT

A method for determining chromaticity information and a related electronic device. The method includes: starting, by the electronic device, a camera application; obtaining, by a first channel of a multispectral sensor, a first channel value; sending the first channel value to an automatic white balance module; selecting, by the automatic white balance module, a target algorithm from a plurality of algorithms based on the first channel value; and determining, by the electronic device, target chromaticity information based on a target algorithm.

20 Claims, 19 Drawing Sheets

(56) References Cited

U.S. PATENT DOCUMENTS

| | | |
|---|---|---|
| 2015/0256806 A1 | 9/2015 | Yamamoto |
| 2016/0165202 A1 | 6/2016 | Lee |
| 2017/0034494 A1 | 2/2017 | Kang et al. |
| 2017/0111623 A1 | 4/2017 | Hung |
| 2019/0045163 A1 | 2/2019 | Nikkanen et al. |
| 2020/0228769 A1 | 7/2020 | Yu |
| 2022/0360756 A1 | 11/2022 | Siess et al. |
| 2022/0412798 A1 | 12/2022 | Siess et al. |

FOREIGN PATENT DOCUMENTS

| | | |
|---|---|---|
| CN | 112866656 A | 5/2021 |
| WO | 2021037934 A1 | 3/2021 |
| WO | 2021105398 A1 | 6/2021 |

\* cited by examiner

METHOD FOR DETERMINING CHROMATICITY INFORMATION AND RELATED ELECTRONIC DEVICE

CROSS-REFERENCE TO RELATED APPLICATIONS

This application is a U.S. National Stage of International Application No. PCT/CN2022/091965 filed on May 10, 2022, which claims priority to Chinese Patent Application No. 202110925200.8, filed with the China National Intellectual Property Administration on Aug. 12, 2021, both of which are incorporated herein by reference in their entireties.

TECHNICAL FIELD

This application relates to the field of image processing, and in particular, to a method for determining chromaticity information and related electronic device.

BACKGROUND

White balance is an adjustment that can be made by digital camera devices or related software on a captured image to ensure that white color in the image can properly reflect the actual white color in a real-world scene in which the image is shot. White balance is related to color temperature, which measures the quality of light based on a ratio of an amount of blue light to an amount of red light in images and scenes, in Kelvins. An image or scene with a higher color temperature has more blue hues than an image or scene with a lower color temperature. Therefore, "cooler" light has a higher color temperature, while "hotter" light has a lower color temperature.

The human eye and brain can adapt to different color temperatures. For example, whether in sunlight or under various lights, the human eye sees white objects as white, that is, the human eye achieves color constancy. A charge-coupled device (Charge-coupled Device, CCD) circuit or a CMOS circuit in a camera that is used to convert an optical signal into an electrical signal cannot correct color changes of a light source as the human eye does. Therefore, it is required to estimate chromaticity of a light source for the captured image by using a white balance algorithm, and adjust a color of the image based on the estimated chromaticity of the light source to make the color of the adjusted image consistent with the color actually observed by the human eye. How to improve the accuracy of the white balance algorithm becomes a growing concern of technical personnel.

SUMMARY

Embodiments of this application provides a method for determining chromaticity information, so as to solve the problem that accuracy of chromaticity information calculated by using AWB and AI AWB fusion algorithms is not high.

According to a first aspect, an embodiment of this application provides a method for determining chromaticity information, which is applied to an electronic device. The electronic device includes a multispectral sensor, an automatic white balance module, and an AI automatic white balance module, where the automatic white balance module includes a plurality of algorithms. The method includes: starting, by the electronic device, a camera application; obtaining, by the multispectral sensor, a first channel value, where the multispectral sensor includes a first channel, and the first channel value is a value obtained by the first channel; sending the first channel value to the automatic white balance module; selecting, by the automatic white balance module, a target algorithm from a plurality of algorithms based on the first channel value; and determining, by the electronic device based on the target algorithm, target chromaticity information. In the foregoing embodiment, because the automatic white balance module can select, based on the first channel value, the target algorithm which is an AWB algorithm that matches a current shooting environment, the target chromaticity information calculated by the electronic device based on the target algorithm is more accurate. A better effect can be achieved when the electronic device white balances an image by using the target chromaticity information.

With reference to the first aspect, in an implementation, the method further includes: obtaining, by the multispectral sensor, a first correlated color temperature; sending the first correlated color temperature to the AI automatic white balance module; determining, by the AI automatic white balance module, a difference between the first correlated color temperature and a second correlated color temperature, where the second correlated color temperature is a correlated color temperature value obtained by the AI automatic white balance module based on an image acquired by the camera; in a case that the difference is greater than a preset threshold, adjusting a confidence level output by the AI automatic white balance module to a first confidence level; and determining, by the electronic device based on the first confidence level, the target chromaticity information. In the foregoing embodiment, the electronic device adjusts, based on the difference between the first correlated color temperature and the second correlated color temperature, the confidence level output by the AI automatic white balance to obtain the first confidence level. This improves accuracy of the first confidence level, so that the target chromaticity information obtained by calculation based on the first confidence level is more accurate, and a better effect is achieved when the electronic device white balances an image by using the target chromaticity information.

With reference to the first aspect, in an implementation, the method further includes: when the start is a cold start, obtaining, by the multispectral sensor, first chromaticity information; and determining, by the electronic device, that the target chromaticity information is the first chromaticity information. In this way, the electronic device can use the first chromaticity information to white balance the first one or more frames of images output by the camera, so that no color cast occurs in the first one or more frames of images.

With reference to the first aspect, in an implementation, the method further includes: when the automatic white balance module or the AI automatic white balance module determines that the image acquired by the camera is a solid-color image, determining, by the electronic device, that the target chromaticity information is second chromaticity information, where the second chromaticity information is chromaticity information obtained by the multispectral sensor. In this way, in a case that the automatic white balance module or the AI automatic white balance module cannot accurately calculate chromaticity information of the solid-color image, the electronic device can still white balance the image by using the more accurate second chromaticity information, thereby preventing color cast of the image.

With reference to the first aspect, in an implementation, the first channel value includes one or more of the following: a visible light channel value, an NIR channel value, and a clear channel value.

With reference to the first aspect, in an implementation, the determining, by the electronic device based on the first confidence level, the target chromaticity information specifically includes: performing, by the automatic white balance module by using the target algorithm, calculation on the image acquired by the camera to obtain a third correlated color temperature and a first chromaticity distance; obtaining, by the AI automatic white balance module based on the image acquired by the camera, a fourth correlated color temperature and a second chromaticity distance; correcting, by the electronic device, the first confidence level to obtain a second confidence level; merging, by the electronic device based on the second confidence level, the third correlated color temperature and the fourth correlated color temperature to obtain a fifth correlated color temperature; merging, by the electronic device based on the second confidence level, the first chromaticity distance and the second chromaticity distance to obtain a third chromaticity distance; and obtaining, by the electronic device based on the fifth correlated color temperature and the third chromaticity distance, the target chromaticity information. In the foregoing embodiment, because the automatic white balance module uses the target algorithm to calculate the first chromaticity distance and the third correlated color temperature, the obtained first chromaticity distance and third correlated color temperature are highly accurate. The electronic device adjusts, based on the difference between the first correlated color temperature and the second correlated color temperature, the confidence level output by the AI automatic white balance, to obtain the first confidence level. This improves accuracy of the first confidence level. In addition, as the second confidence level is obtained by correction of the first confidence level, accuracy of the second confidence level is also improved. The third chromaticity distance is obtained by the electronic device by merging, based on the second confidence level, the first chromaticity distance and the second chromaticity distance, and the fifth correlated color temperature is obtained by the electronic device by merging, based on the second confidence level, the third correlated color temperature and the fourth correlated color temperature. Therefore, accuracy of the third chromaticity distance and the fifth correlated color temperature is also improved, so that accuracy of the target chromaticity information obtained based on the third chromaticity distance and the fifth correlated color temperature is also improved. The electronic device uses the target chromaticity information to white balance the image, which can prevent color cast of the image more effectively.

With reference to the first aspect, in an implementation, the obtaining, by the electronic device based on the fifth correlated color temperature and the third chromaticity distance, the target chromaticity information specifically includes: adjusting a propensity of the fifth correlated color temperature to obtain a sixth correlated color temperature; adjusting a propensity of the third chromaticity distance to obtain a fourth chromaticity distance; and obtaining the target chromaticity information based on the sixth correlated color temperature and the fourth chromaticity distance. In this way, the electronic device can obtain more accurate target chromaticity information based on the sixth correlated color temperature and the fourth chromaticity distance. When the electronic device uses the target chromaticity information to white balance the image, color cast of the image can be prevented more effectively.

With reference to the first aspect, in an implementation, the obtaining, by the AI automatic white balance module based on the image acquired by the camera, a fourth correlated color temperature and a second chromaticity distance specifically includes: outputting, by the AI automatic white balance module, the second correlated color temperature and an initial chromaticity distance based on the image acquired by the camera; correcting the second correlated color temperature and the initial chromaticity distance to obtain a corrected second correlated color temperature and a corrected initial chromaticity distance; and performing time series filtering based on the corrected second correlated color temperature and the corrected initial chromaticity distance to obtain the fourth correlated color temperature and the second chromaticity distance. In this way, the fourth correlated color temperature and second chromaticity distance obtained by time series filtering are more accurate.

With reference to the first aspect, in an implementation, the performing time series filtering based on the corrected second correlated color temperature and the corrected initial chromaticity distance to obtain the fourth correlated color temperature and the second chromaticity distance specifically includes: updating a first covariance matrix according to a formula $$\text{Sigma}_1' = \text{Sigma}_1 + \lambda_1 * \begin{bmatrix} 1 & 0 \\ 0 & 1 \end{bmatrix}$$

to obtain an updated first covariance matrix, where $\text{Sigma}_1'$ is the updated first covariance matrix, $\text{Sigma}_1$ is the first covariance matrix, $\lambda_1$ is a first parameter, and the first covariance matrix is a covariance matrix output by the AI automatic white balance module based on the image acquired by the camera, or the first covariance matrix is a covariance matrix calculated based on the second confidence level; updating a second covariance matrix according to a formula $$\text{Sigma}_2' = \text{Sigma}_2 + \lambda_2 * \begin{bmatrix} 1 & 0 \\ 0 & 1 \end{bmatrix}$$

to obtain an updated second covariance matrix, where the second covariance matrix is a covariance matrix of a second image, the second image is a previous frame of image acquired by the camera. $\text{Sigma}_2'$ is the updated second covariance matrix, $\text{Sigma}_2$ is the second covariance matrix, and $\lambda_2$ is a second parameter; performing calculation based on the corrected second correlated color temperature and the corrected initial chromaticity distance to obtain a first filter vector; obtaining a second filter vector according to a formula $\text{Mu}=\text{Mu}_1*(\text{Sigma}_1')^{-1}+\text{Mu}_2*(\text{Sigma}_2')^{-1}$, where $\text{Mu}_1$ is the first filter vector. $\text{Mu}_2$ is a filter vector of the second image, and Mu is the second filter vector; and performing calculation based on the second filter vector to obtain the fourth correlated color temperature and the second chromaticity distance. In this way, the fourth correlated color temperature and second chromaticity distance obtained by time series filtering are more accurate.

With reference to the first aspect, in an implementation, the merging, by the electronic device based on the second confidence level, the third correlated color temperature and the fourth correlated color temperature to obtain a fifth correlated color temperature specifically includes: determining a first probability value based on a light value of the image acquired by the camera, the fourth correlated color temperature, and the second chromaticity distance; and calculating the fifth correlated color temperature according to a formula $CCT_5 = Conf\_2*X'*CCT_4 + (1 - Conf\_2*X')*CCT_3$, where the Conf_2 is the second confidence level, X' is the first probability value, $CCT_4$ is the fourth correlated color temperature, $CCT_3$ is the third correlated color temperature, and $CCT_5$ is the fifth correlated color temperature. In this way, the electronic device can obtain more accurate target chromaticity information based on the fifth correlated color temperature and the third chromaticity distance. When the electronic device uses the target chromaticity information to white balance the image, color cast of the image can be prevented more effectively.

With reference to the first aspect, in an implementation, the merging, by the electronic device based on the second confidence level, the first chromaticity distance and the second chromaticity distance to obtain a third chromaticity distance specifically includes: determining a second probability value based on the light value of the image acquired by the camera, the fourth correlated color temperature, and the second chromaticity distance, and calculating the third chromaticity distance according to a formula $D_{uv3} = Conf\_2*Y'*Du_2 + (1 - Conf\_2*Y')*D_{uv1}$, where Conf_2 is the second confidence level, Y' is the second probability value, $D_{uv1}$ is the first chromaticity distance, $D_{uv2}$ is the second chromaticity distance, and $D_{uv3}$ is the third chromaticity distance. In this way, the electronic device can obtain more accurate target chromaticity information based on the fifth correlated color temperature and the third chromaticity distance. When the electronic device uses the target chromaticity information to white balance the image, color cast of the image can be prevented more effectively.

With reference to the first aspect, in an implementation, the adjusting a propensity of the fifth correlated color temperature to obtain a sixth correlated color temperature specifically includes: determining a first correlated color temperature adjustment value based on the light value of the image acquired by the camera, the fifth correlated color temperature, and the third chromaticity distance; and obtaining the sixth correlated color temperature according to a formula $CCT_6 = CCT_5 + Delta\_CCT'$, where $CCT_5$ is the fifth correlated color temperature, $CCT_6$ is the sixth correlated color temperature, and Delta_CCT' is the first correlated color temperature adjustment value. In this way, the electronic device white balances the image uses the target chromaticity information calculated based on the sixth correlated color temperature and the fourth chromaticity distance, making an image color more visually acceptable to a user while preventing image color cast.

With reference to the first aspect, in an implementation, the adjusting a propensity of the third chromaticity distance to obtain a fourth chromaticity distance specifically includes: determining a first chromaticity distance adjustment value based on the light value of the image acquired by the camera, the fifth correlated color temperature, and the third chromaticity distance; and obtaining the fourth chromaticity distance according to a formula $D_{uv4} = D_{uv3} + Delta\_D_{uv}'$, where $D_{uv4}$ is the fourth chromaticity distance, $D_{uv3}$ is the third chromaticity distance, and $Delta\_D_{uv}'$ is the first chromaticity distance adjustment value. In this way, the electronic device white balances the image uses the target chromaticity information calculated based on the sixth correlated color temperature and the fourth chromaticity distance, making an image color more visually acceptable to a user while preventing image color cast.

According to a second aspect, an embodiment of this application provides an electronic device. The electronic device includes: one or more processors and a memory, where the memory is coupled to the one or more processors; the memory is configured to store computer program code, where the computer program code includes computer instructions; and the one or more processors invoke the computer instructions to cause the electronic device to perform the following steps: starting, by the electronic device, a camera application; obtaining, by a multispectral sensor, a first channel value, where the multispectral sensor includes a first channel, and the first channel value is a value obtained by the first channel; sending the first channel value to an automatic white balance module; selecting, by the automatic white balance module, a target algorithm from a plurality of algorithms based on the first channel value; and determining, by the electronic device based on the target algorithm, target chromaticity information.

With reference to the second aspect, in an implementation, the one or more processors are further configured to invoke the computer instructions to cause the electronic device to perform the following steps: obtaining, by the multispectral sensor, a first correlated color temperature; sending the first correlated color temperature to an AI automatic white balance module; determining, by the AI automatic white balance module, a difference between the first correlated color temperature and a second correlated color temperature, where the second correlated color temperature is a correlated color temperature value obtained by the AI automatic white balance module based on an image acquired by the camera; in a case that the difference is greater than a preset threshold, adjusting a confidence level output by the AI automatic white balance module to a first confidence level; and determining, by the electronic device based on the first confidence level, the target chromaticity information.

With reference to the second aspect, in an implementation, the one or more processors are further configured to invoke the computer instructions to cause the electronic device to perform the following steps: when the start is a cold start, obtaining, by the multispectral sensor, first chromaticity information; and determining, by the electronic device, that the target chromaticity information is the first chromaticity information.

With reference to the second aspect, in an implementation, the one or more processors are further configured to invoke the computer instructions to cause the electronic device to perform the following step; when the automatic white balance module or the AI automatic white balance module determines that the image captured by the camera is a solid-color image, determining, by the electronic device, that the target chromaticity information is second chromaticity information, where the second chromaticity information is chromaticity information obtained by the multispectral sensor.

With reference to the second aspect, in an implementation, the one or more processors are further configured to invoke the computer instructions to cause the electronic device to perform the following steps: performing, by the automatic white balance module by using the target algorithm, calculation on the image acquired by the camera to obtain a third correlated color temperature and a first chromaticity distance; obtaining, by the AI automatic white balance module based on the image acquired by the camera, a fourth correlated color temperature and a second chromaticity distance; correcting, by the electronic device, the first confidence level to obtain a second confidence level; merging, by the electronic device based on the second confidence level, the third correlated color temperature and the fourth correlated color temperature to obtain a fifth correlated color temperature; merging, by the electronic device based on the second confidence level, the first chromaticity distance and the second chromaticity distance to obtain a third chromaticity distance; and obtaining, by the electronic device based on the fifth correlated color temperature and the third chromaticity distance, the target chromaticity information.

With reference to the second aspect, in an implementation, the one or more processors are further configured to invoke the computer instructions to cause the electronic device to perform the following steps: adjusting a propensity of the fifth correlated color temperature to obtain a sixth correlated color temperature; adjusting a propensity of the third chromaticity distance to obtain a fourth chromaticity distance; and obtaining the target chromaticity information based on the sixth correlated color temperature and the fourth chromaticity distance.

With reference to the second aspect, in an implementation, the one or more processors are further configured to invoke the computer instructions to cause the electronic device to perform the following steps: outputting, by the AI automatic white balance module, the second correlated color temperature and an initial chromaticity distance based on the image acquired by the camera; correcting the second correlated color temperature and the initial chromaticity distance to obtain a corrected second correlated color temperature and a corrected initial chromaticity distance; and performing time series filtering based on the corrected second correlated color temperature and the corrected initial chromaticity distance to obtain the fourth correlated color temperature and the second chromaticity distance.

With reference to the second aspect, m an implementation, the one or more processors are further configured to invoke the computer instructions to cause the electronic device to perform the following steps: updating a first covariance matrix according to a formula $$\text{Sigma}'_1 = \text{Sigma}_1 + \lambda_1^* \begin{bmatrix} 1 & 0 \\ 0 & 1 \end{bmatrix}$$

to obtain an updated first covariance matrix, % where Sigma$_1$' is the updated first covariance matrix, Sigma$_1$ is the first covariance matrix, $\lambda_1$ is a first parameter, and the first covariance matrix is a covariance matrix output by the AI automatic white balance module based on the image acquired by the camera, or the first covanance matrix is a covariance matrix calculated based on the second confidence level; updating a second covariance matrix according to a formula $$\text{Sigma}'_2 = \text{Sigma}_2 + \lambda_2 * \begin{bmatrix} 1 & 0 \\ 0 & 1 \end{bmatrix}$$

to obtain an updated second covariance matrix, where the second covariance matrix is a covariance matrix of a second image, the second image is a previous frame of image acquired by the camera, Sigma$_2$' is the updated second covariance matrix, Sigma$_2$ is the second covariance matrix, and $\lambda_2$ is a second parameter; performing calculation based on the corrected second correlated color temperature and the corrected initial chromaticity distance to obtain a first filter vector; obtaining a second filter vector according to a formula $Mu = Mu_1 * (Sigma_1')^{-1} + Mu_2 * (Sigma_2')^{-1}$, where $Mu_1$ is the first filter vector, $Mu_2$ is a filter vector of the second image, and Mu is the second filter vector; and performing calculation based on the second filter vector to obtain the fourth correlated color temperature and the second chromaticity distance.

With reference to the second aspect, in an implementation, the one or more processors are further configured to invoke the computer instructions to cause the electronic device to perform the following steps: determining a first probability value based on a light value of the image acquired by the camera, the fourth correlated color temperature, and the second chromaticity distance; and calculating the fifth correlated color temperature according to a formula $CCT_5 = Conf\_2 * X' * CCT_4 + (1 - Conf\_2 * X') * CCT_3$, where the Conf_2 is the second confidence level, X' is the first probability value, $CCT_4$ is the fourth correlated color temperature, $CCT_3$ is the third correlated color temperature, and $CCT_5$ is the fifth correlated color temperature.

With reference to the second aspect, m an implementation, the one or more processors are further configured to invoke the computer instructions to cause the electronic device to perform the following steps: determining a second probability value based on the light value of the image acquired by the camera, the fourth correlated color temperature, and the second chromaticity distance; and calculating the third chromaticity distance according to a formula $D_{uv3} = Conf\_2 * Y' * D_{uv2} + (1 - Conf\_2 * Y') * D_{uv1}$, where Conf_2 is the second confidence level, Y' is the second probability value, $D_{uv1}$ is the first chromaticity distance, $D_{uv2}$ is the second chromaticity distance, and $D_{uv3}$ is the third chromaticity distance.

With reference to the second aspect, in an implementation, the one or more processors are further configured to invoke the computer instructions to cause the electronic device to perform the following steps: determining a first correlated color temperature adjustment value based on the light value of the image acquired by the camera, the fifth correlated color temperature, and the third chromaticity distance; and obtaining the sixth correlated color temperature according to a formula $CCT_6 = CCT_5 + Delta\_CCT'$, where $CCT_5$ is the fifth correlated color temperature, $CCT_6$ is the sixth correlated color temperature, and Delta_CCT' is the first correlated color temperature adjustment value.

With reference to the second aspect, in an implementation, the one or more processors are further configured to invoke the computer instructions to cause the electronic device to perform the following steps: determining a first chromaticity distance adjustment value based on the light value of the image acquired by the camera, the fifth correlated color temperature, and the third chromaticity distance; and obtaining the fourth chromaticity distance according to a formula $D_{uv4} = D_{uv3} + Delta\_D'$, where $D_{uv4}$ is the fourth chromaticity distance, $D_{uv3}$ is the third chromaticity distance, and Delta_$D_{uv}$' is the first chromaticity distance adjustment value.

According to a third aspect, an embodiment of this application provides an electronic device, including: a touchscreen, a camera, one or more processors, and one or more memories, where the one or more processors are coupled to the touchscreen, the camera, and the one or more memories; the one or more memories are configured to store computer program code, where the computer program code includes computer instructions; and when the one or more processors executes the computer instructions, the electronic device is caused to perform the method according to any one of the first aspect or the possible implementations of the first aspect.

According to a fourth aspect, an embodiment of this application provides a chip system, where the chip system is applied to an electronic device, the chip system includes one or more processors, and the processor is configured to invoke computer instructions to cause the electronic device to perform the method according to any one of the first aspect or the possible implementations of the first aspect.

According to a fifth aspect, an embodiment of this application provides a computer program product including instructions, where when the computer program product runs on an electronic device, the electronic device is caused to perform the method according to any one of the first aspect or the possible implementations of the first aspect.

According to a sixth aspect, an embodiment of this application provides a computer-readable storage medium including instructions, where when the instructions are executed on an electronic device, the electronic device is caused to perform the method according to any one of the first aspect or the possible implementations of the first aspect.

DESCRIPTION OF EMBODIMENTS

Figure 1:
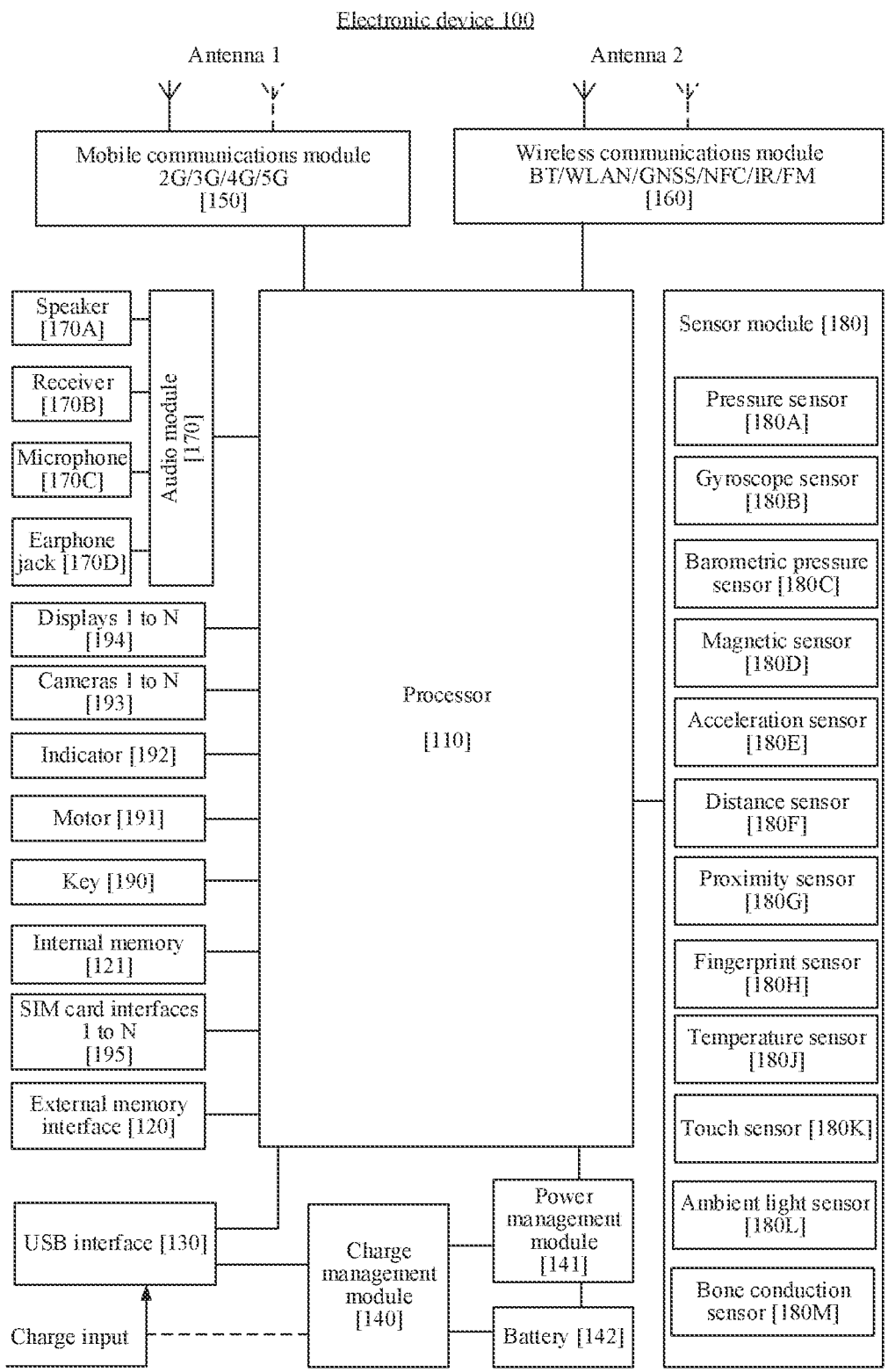
FIG. 1 is a schematic diagram of a hardware structure of an electronic device 100 according to an embodiment of this application.

The technical solutions in the embodiments of this application will be clearly and completely described below in conjunction with the drawings in the embodiments of this application. Apparently, the described embodiments are merely some rather than all of the embodiments of this application. The "embodiment" mentioned herein means that a particular feature, structure, or characteristic described with reference to the embodiment can be included in at least one embodiment of this application. This term appearing in various parts of the specification not necessarily refers to the same embodiment, nor an independent or alternative embodiment that is mutually exclusive to other embodiments. Those skilled in the art can explicitly and implicitly understand that the embodiments described herein may be combined with other embodiments. All other embodiments obtained by those of ordinary skill in the art based on the embodiments of this application without creative efforts shall fall within the protection scope of this application.

The terms such as "first". "second", and "third" in the specification, claims, and drawings of this application are used to distinguish between different objects, rather than to describe a specific order. In addition, the terms "comprise" and "have" and any variations thereof are intended to cover a non-exclusive inclusion. For example, a series of steps or units are included, or optionally, steps or units that are not listed are included, or optionally, other steps or units inherent to the process, the method, the product, or the device are also included.

The drawings show only parts related to this application rather than all content of this application. Before example embodiments are discussed in more detail, it should be noted that some example embodiments are described as processing or methods that are depicted as flowcharts. Although the flowcharts describe various operations (or steps) as sequential processing, many of the operations may be implemented in parallel, concurrently, or simultaneously. In addition, the sequence of the operations may be rearranged. The processing may be terminated when its operations are completed, but it may also have additional steps not included in the drawings. The processing may correspond to methods, functions, procedures, subroutines, subprograms, and so on.

The terms such as "component", "module", "system", and "unit" used in the specification are used to refer to a computer-related entity, hardware, firmware, a combination of hardware and software, software, or software in execution. For example, the unit may be, but is not limited to, a process running on a processor, a processor, an object, an executable file, a thread of execution, or a program, and/or may be distributed between two or more computers. In addition, these units are executable from various computer-readable media having various data structures stored thereon. The units may communicate with each other by using local and/or remote processes, for example, based on a signal having one or more data packets (e.g., data from a second unit that interacts with another unit between a local system and a distributed system and/or a network, or the Internet that interacts with other systems via signals).

The technical terms used in the embodiments of this application are explained below.

(1) Planckian locus: An object that can absorb without reflection or transmission all of the incident radiation under the action of radiation is referred to as a black body or a perfect radiator. When the black body is continuously heated, its maximum value in relative spectral power distribution changes along a short-wavelength direction, and the corresponding light colors change according to the sequence of red, yellow, white, and blue. An arc-shaped locus formed on a chromaticity diagram by light color changes corresponding to a black body at different temperatures is referred to as a black body locus or a Planckian locus.

(2) Correlated color temperature (Correlated Color Temperature, CCT): is a temperature of a black body radiator closest to a color of a stimulus with the same luminance, which, measured in degrees Kelvin, is a metric of a color of light near the Planckian locus. Other light sources different from thermal radiation light sources have a linear spectrum, and their radiation characteristics are quite different from the black body radiation characteristics. Therefore, light colors of these light sources do not necessarily fall exactly on the black body locus on the chromaticity diagram. CCT is generally used to describe color characteristics of such light sources.

(3) Chromaticity distance ($D_{uv}$): a distance from a chromaticity value (u, v) of a test light source to the closest point on a Planckian locus, where $D_{uv}$ represents information about the chromaticity value (u, v) of the test light source and a color shift (green or pink) and a direction of the Planckian locus.

(4) Light value (Lighting Value, LV): is used to estimate ambient brightness. A specific calculation formula thereof is as follows:

$$LV = 10 * \log_2\left(\frac{Aperature^2}{Exposure} * \frac{100}{Iso} * \frac{Luma}{46}\right)$$

where Exposure is an exposure time, Aperture is an aperture size, Iso is light sensitivity, and Luma is an average Y value of an image in an XYZ color space.

(5) XYZ space: An RGB value in the embodiments of this application is DeviceRGB. A DeviceRGB color space is a device-dependent color space, meaning that different devices have different understandings of an RGB value. Therefore, DeviceRGB is not suitable for calculating a parameter such as a light value. To calculate an LV, the DeviceRGB color space needs to be converted into a device-independent XYZ space, that is, an RGB value needs to be converted into an XYZ value.

A common method for converting an RGB color space to an XYZ space is as follows: A color correction matrix (Color Correction Matrix, CCM) with a size of 3*3 is calibrated in different light source environments (typical light sources include A, H, U30, TL84, D50, D65, D75, and the like), and CCMs for different light sources are stored in memory of electronic device. According ro the following formula:

$$\begin{bmatrix} X \\ Y \\ Z \end{bmatrix} = \begin{bmatrix} CCM11 & CCM12 & CCM13 \\ CCM21 & CCM22 & CCM23 \\ CCM31 & CCM32 & CCM33 \end{bmatrix} * \begin{bmatrix} R \\ G \\ B \end{bmatrix}$$

a three-dimensional vector corresponding to an image in the XYZ space is obtained, thereby implementing the conversion from the RGB space to the XYZ space. During a shooting process, a light source is usually matched based on a white balance reference point in an image, and a CCM corresponding to the light source is selected. If an RGB value of the white balance reference point is between two light sources (for example, the RGB value of the image falls between D50 and D65), the CCM can be obtained by bilinear interpolation of D50 and D65. For example, a color correction matrix and a correlated color temperature for D50 are $CCM_1$ and $CCT_1$ respectively, a color correction matrix and a correlated color temperature for D60 are $CCM_2$ and $CCT_2$ respectively, and a correlated color temperature of an image light source is $CCT_a$. According to the following formula:

$$g = \frac{CCT_a^{-1} - CCT_2^{-1}}{CCT_1^{-1} - CCT_2^{-1}}$$

the electronic device can calculate a proportion value g. Based on the proportion value, the CCM for the image can be calculated according to the following formula:

$$CCM = g*CCM_1 + (1-g)*CCM_2$$

FIG. 1 is a schematic diagram of a hardware structure of an electronic device 100 according to an embodiment of this application. The electronic device 100 may include a processor 110, an external memory interface 120, an internal memory 121, a universal serial bus (Universal Serial Bus, USB) interface 130, a charge management module 140, a power management module 141, a battery 142, an antenna 1, an antenna 2, a mobile communication module 150, a wireless communication module 160, an audio module 170, a speaker 170A, a receiver 170B, a microphone 170C, an earphone jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, or the like.

It can be understood that the structure illustrated in the embodiments of the present invention does not constitute a specific limitation on the electronic device 100. In some other embodiments of this application, the electronic device 100 may include more or fewer components than those shown in the drawings, have some components combined or split, or have different arrangements of the components. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor. DSP), a baseband processor, a neural-network processing unit (neural-network processing unit, NPU), and/or the like. Different processing units may be independent components, or may be integrated into one or more processors.

The processor 110 may further be provided with a memory for storing instructions and data. In some embodiments, the memory in the processor 110 is a cache memory. The memory may store instructions or data just used or used repeatedly by the processor 110. If the processor 110 needs to use the instructions or data again, the processor may directly invoke the instructions or data from the memory. This avoids repeated access and reduces a waiting time of the processor 110, thereby improving efficiency of a system.

The electronic device 100 implements a display function by using the GPU, the display 194, the application processor, and the like. The GPU is a microprocessor for image processing which is connected to the display 194 and the application processor. The GPU is configured to perform mathematical and geometric computation for graphics rendering. The processor 110 may include one or more GPUs that execute program instructions to generate or change display information.

The display 194 is configured to display images, videos, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode. AMOLED), a flexible light-emitting diode (flex light-emitting diode, FLED), a mini-LED, a micro-LED, a micro-OLED, a quantum dot light emitting diode (quantum dot light emitting diodes. QLED), or the like. In some embodiments, the electronic device 100 may include 1 or N displays 194, where N is a positive integer greater than 1.

The electronic device 100 may implement a shooting function by using the ISP, the camera 193, the video codec, the GPU, the display 194, the application processor, and the like.

The ISP is configured to process data fed back by the camera 193. For example, when a shutter is opened for taking a photo, light is transmitted to a photosensitive element of the camera through a lens so that an optical signal is converted into an electrical signal. The photosensitive element of the camera transmits the electrical signal to the ISP for processing, so that the electrical signal is converted into an image visible to naked eyes. The ISP may further optimize noise, luminance, and skin tone of the image by using an algorithm. The ISP may further optimize exposure, color temperature, and other parameters of a shooting scene. In some embodiments, the ISP may be provided in the camera 193.

The camera 193 is configured to capture a static image or a video. An optical image generated by an object through the lens is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP which converts the electrical signal into a digital image signal. The ISP outputs the digital image signal to the DSP for processing. The DSP converts the digital image signal into an image signal in a standard format such as RGB or YUV. In some embodiments, the electronic device 100 may include 1 or N cameras 193, where N is a positive integer greater than 1.

The digital signal processor is configured to process digital signals, including digital image signals and other digital signals. For example, when the electronic device 100 selects a frequency, the digital signal processor is configured to perform Fourier transform on energy at that frequency.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, voice recognition, and text understanding may be implemented through the NPU.

The internal memory 121 may be configured to store computer-executable program code, where the executable program code includes instructions. By running the instructions stored in the internal memory 121, the processor 110 executes various functional applications and data processing of the electronic device 100. The internal memory 121 may include a program storage area and a data storage area. The program storage area may store an operating system, an application program required by at least one function (for example, a sound playing function or an image playing function), and the like. The data storage area may store data (for example, audio data or address book) and the like created during use of the electronic device 100. In addition, the internal memory 121 may include a high-speed random access memory, and may also include a non-volatile memory, for example, at least one magnetic disk storage device, flash memory device, or universal flash storage (universal flash storage, UFS).

The pressure sensor 180A is configured to sense a pressure signal, and convert the pressure signal into an electrical signal. In some embodiments, the pressure sensor 180A may be disposed on the display 194.

The gyroscope sensor 180B may be configured to determine a motion gesture of the electronic device 100. In some embodiments, angular velocities of the electronic device 100 around three axes (namely. X, Y, and z axes) may be determined by using the gyroscope sensor 180B. The gyroscope sensor 180B may be used for image stabilization during shooting. The gyroscope sensor 180B may also be used for navigation and somatosensory game scenarios.

The ambient light sensor 180L is configured to sense luminance of ambient light. The electronic device 100 may adaptively adjust brightness of the display 194 based on the sensed luminance of the ambient light. The ambient light sensor 180L may also be configured to automatically adjust white balance during photographing. The ambient light sensor 180L may further cooperate with the optical proximity sensor 180G in detecting whether the electronic device 100 is in a pocket, to prevent an accidental touch.

The fingerprint sensor 180H is configured to collect a fingerprint. The electronic device 100 may implement fingerprint unlock, application access lock, fingerprint-based photographing, fingerprint-based call answering, and the like by using a feature of the collected fingerprint.

The touch sensor 180K is also referred to as a "touch panel". The touch sensor 180K may be disposed in the display 194, and the touch sensor 180K and the display 194 form a touchscreen, also referred to as a "touch screen". The touch sensor 180K is configured to detect a touch operation on or near the touch sensor 180K. The touch sensor may transfer the detected touch operation to the application processor to determine a type of a touch event. The display 194 may provide a visual output related to the touch operation. In some other embodiments, the touch sensor 180K may alternatively be disposed on a surface of the electronic device 100 at a location different from a location of the display 194.

A CCD circuit or a CMOS circuit in an electronic device such as a digital camera or a mobile phone cannot correct color changes of a light source. Therefore, to prevent a color temperature problem and the like in an image, it is required to white balance the image. At present, the most frequently used white balance algorithms include a conventional automatic white balance (Automatic White Balance, AWB) algorithm and an artificial intelligence automatic white balance algorithm (AI AWB algorithm). The AWB algorithm includes a gray world algorithm and the like, while the AI AWB algorithm usually calculates a color description value of a white point of an image light source (such as an RGB value of the white point of the image light source, R/G and B/G of the white point of the image light source, or a chromaticity value of the white point of the image light source) by using a trained AI AWB model. The AI AWB model may be a neural network model, a fast fourier color constancy (Fast Fourier Color Constancy, FFCC) model, or another model having a function of calculating a color description value of a white point of an image light source, which is not limited in the embodiments of this application. The color of the white point of the image light source is a color of the image light source. When an RGB value or R/G and B/G of the % white point is calculated, an RGB value or R/G and B/G of an image pixel may be adjusted based on the RGB value or R/G and B/G of the white point, thereby implementing white balance adjustment on the image.

The use of the AWB algorithm for white balance processing on the image feature small amount of calculation and wide range of application scenarios. However, due to the simple calculation logic and small amount of calculation, when a light source environment of a shooting scene is complex, an RGB value of a white point of an image light source that is calculated by using the AWB algorithm is less accurate. As a result, an effect of white balancing the image based on the RGB value of the white point of the image light source is not obvious.

The AI AWB algorithm uses an AI AWB model to perform complex calculation on an input image. In a shooting scene similar to a training scenario, an RGB value of a w % bite point of an image light source calculated by using the AI AWB model is highly accurate. However, due to limited training samples in the process of training the AI AWB model, the AI AWB model cannot be applied to all shooting environments. When the user takes a photo in a shooting scene with poor generalization, the RGB value of the white point of the image light source that is calculated by using the AI AWB model has extremely low accuracy. An adjustment effect of white balancing the image by the ISP based on the RGB value of the white point of the image light source is not obvious.

To solve the problems of the low accuracy of RGB values of white points of image light sources calculated by using the AWB algorithm and the limited application scenarios of the AI AWB algorithm, an embodiment of this application provides a method for determining chromaticity information. The principle of the method is as follows: A multispectral sensor delivers calculated first chromaticity information of a white point of a light source of a to-be-processed image to a memory. Due to a fast startup speed of the multispectral sensor, during a cold start process of a camera, the electronic device may use the first chromaticity information to white balance the first one or more frames of images, so that no color cast occurs in the first one or more frames of images. In addition, during the process in which the electronic device calculates the chromaticity information of the image based on raw data of the image by using the AWB algorithm and the AI AWB algorithm, if the number of white points of the image light source is less than a specific threshold, the electronic device determines that the current shooting scene is a solid-color scene. In the solid-color scene, the chromaticity information of the white point of the image light source that is calculated by the electronic device by using the AWB algorithm and the AI AWB algorithm is inaccurate. Therefore, the electronic device can also invoke the multispectral sensor to white balance the image based on the calculated first chromaticity information. The electronic device processes, by using the AWB algorithm, the raw data of the to-be-processed image that is output by the camera, and spectral data and a correlated color temperature CCT that are output by the multispectral sensor, to obtain an RGB value of the white point of the light source of the image. Based on the RGB value, a ratio $R_{11}/G_{11}$ of an R (red) color channel to a G (green) color channel and a ratio $B_{11}/G_{11}$ of a B (blue) color channel to a G (green) color channel of the white point of the image light source can be obtained. At the same time, the electronic device performs, by using an artificial intelligence automatic white balance algorithm (AI AWB algorithm), calculation on the raw data of the to-be-processed image that is output by the camera, and the spectral data and the CCT that are output by the multispectral sensor, to obtain the RGB value of the white point of the image light source. Based on the RGB value, a ratio $R_{21}/G_{21}$ of an R (red) color channel to a G (green) color channel and a ratio $B_{21}/G_{21}$ of a B (blue) color channel to a G (green) color channel of the white point of the image light source can be obtained. Then the electronic device calculates a correlated color temperature $CCT_{11}$ and a chromaticity distance $D_{uv1}$ of the white point of the image light source based on $R_{11}/G_{11}$ and $B_{11}/G_{11}$, and calculates a correlated color temperature $CCT_{21}$ and a chromaticity distance $D_{uv21}$ of the white point of the image light source based on $R_{21}/G_{21}$ and $B_{21}/G_{21}$. Then the electronic device merges $CCT_{11}$ and $CCT_{21}$ to obtain a merged CCT, and merges $D_{uv11}$ and $D_{uv21}$ to obtain a merged $D_{uv}$. Finally, the electronic device obtains fourth chromaticity information based on the merged CCT and the merged $D_{uv}$ and delivers the fourth chromaticity information to the memory, so that the ISP white balances the image based on the fourth chromaticity information.

An application scenario of the method for determining chromaticity information is described below with reference to FIG. 2A to FIG. 2D.

Figure 2A:
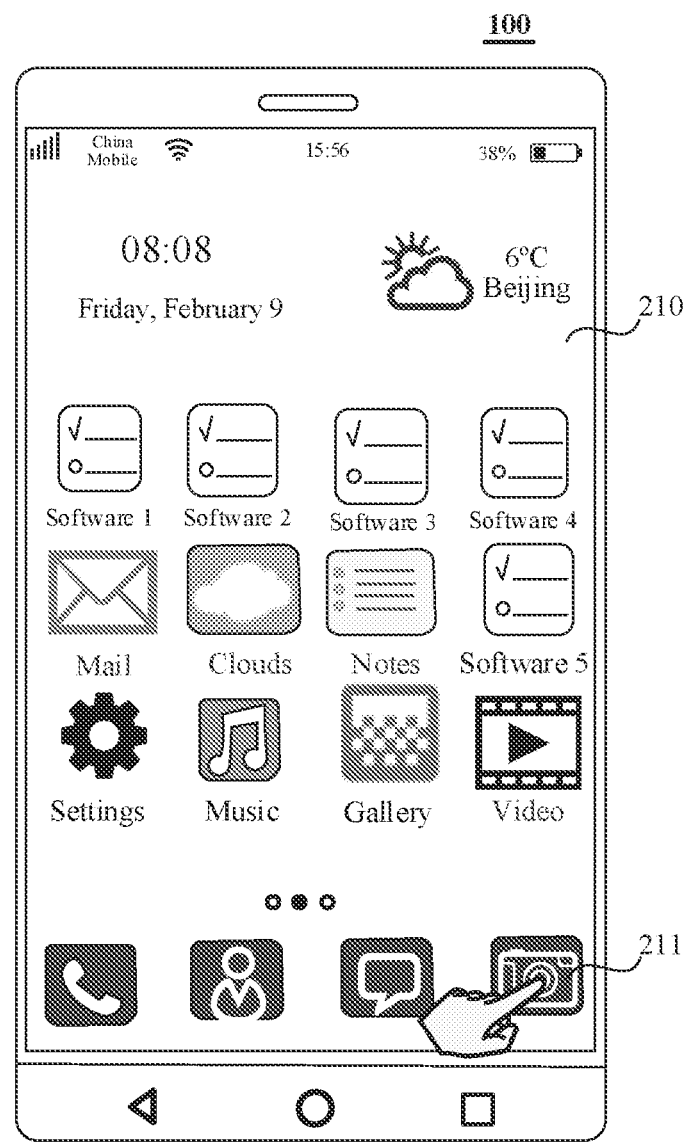
FIG. 2A to FIG. 2C are diagrams of a group of shooting screens according to an embodiment of this application.

As shown in FIG. 2A, the electronic device 100 may display a home screen 210, and the screen 210 includes a plurality of application icons, such as a weather application icon, a video application icon, a notes icon, a settings application icon, and a camera application icon 211. After the electronic device 100 detects an input operation (for example, a tap) on the camera application icon 211, the electronic device 100 may display a shooting screen 220 shown in FIG. 2B, in response to the input operation.

Figure 2B:
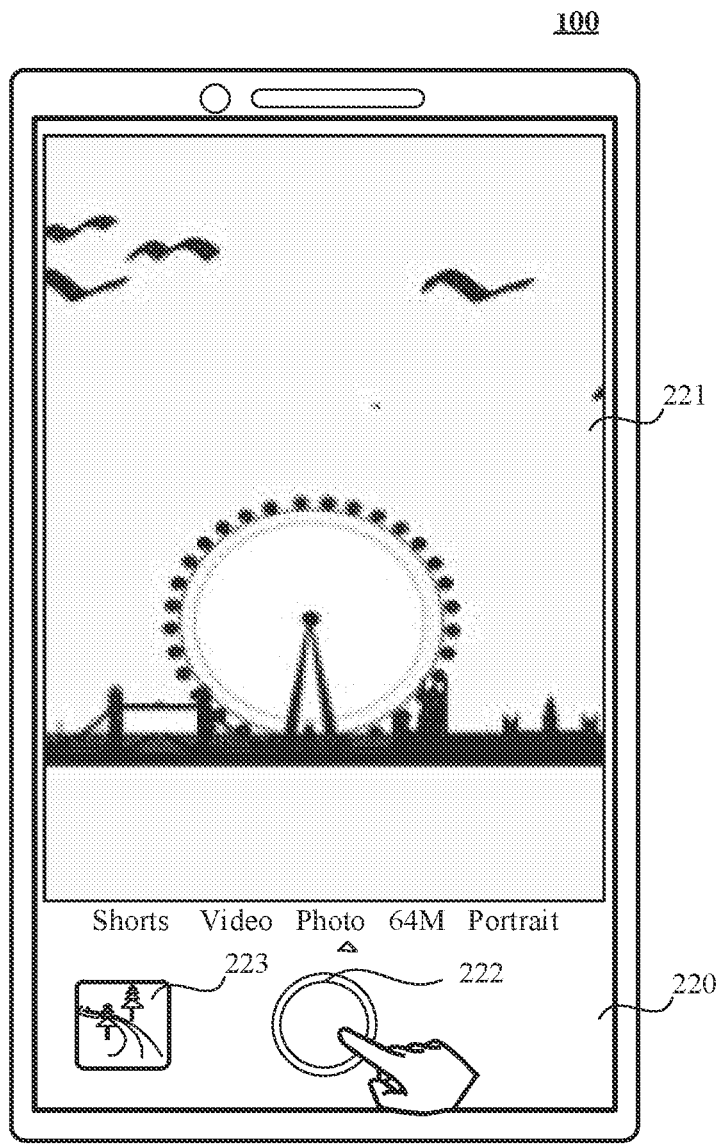
Figure 2C:
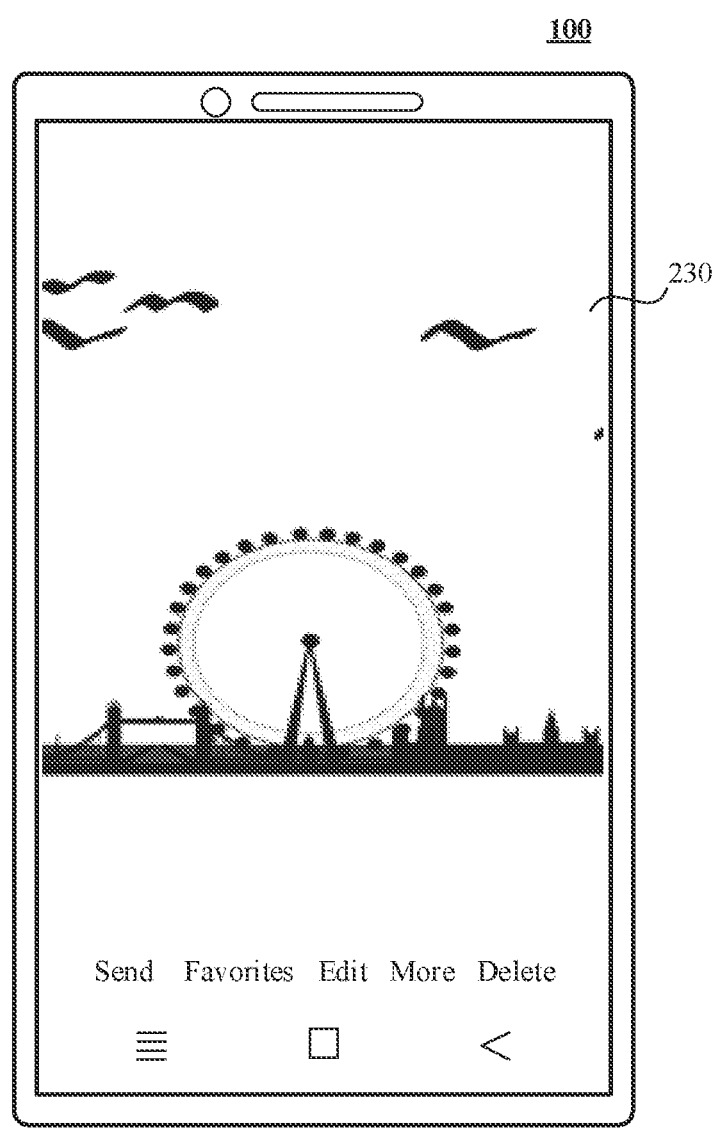

As shown in FIG. 2B, the shooting screen 220 includes a shooting preview screen 221, a shutter control 222, and an echo control 223. The shooting preview screen 221 is used to display a current shooting environment. When the electronic device 100 detects an input operation (for example, a tap) on the echo control 223, the electronic device 100 displays a previously captured photo. After the electronic device 100 detects an input operation (for example, a tap) on the shutter control 222, the electronic device displays a photo preview screen 230 shown in FIG. 2C, in response to the operation. In this way, the user can preview the captured photo in the photo preview screen 230.

Figure 2D:
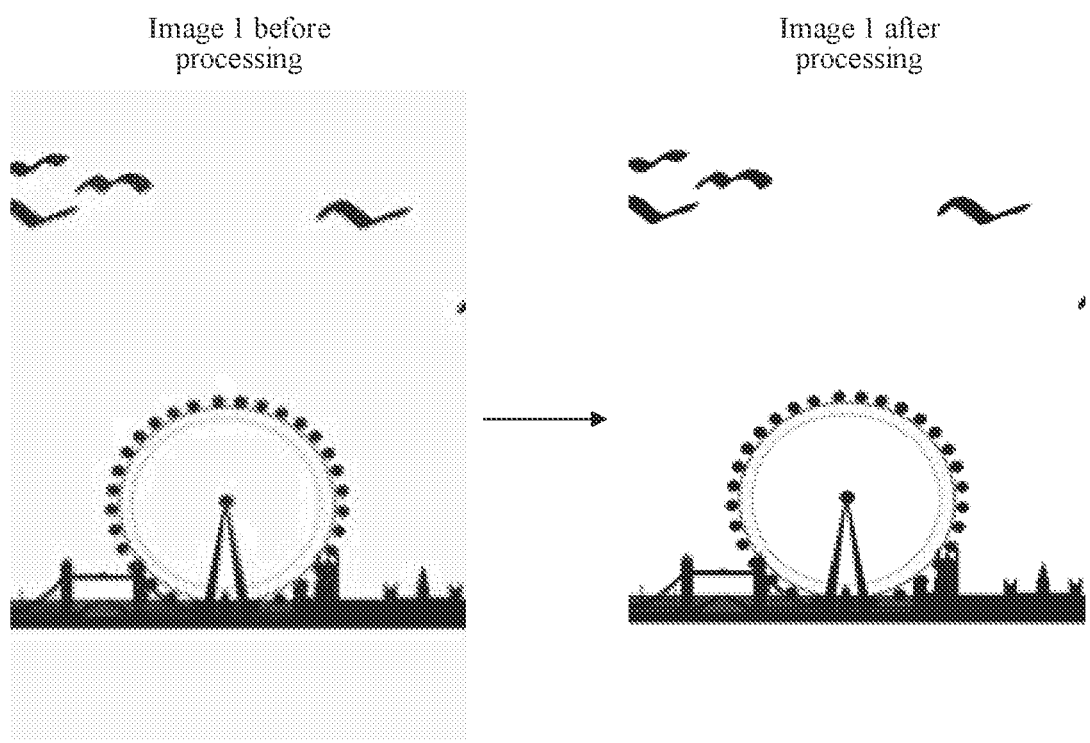
FIG. 2D is a diagram of a comparison effect of an image adjusted by using an automatic white balance algorithm according to an embodiment of this application.

After the electronic device 100 detects the input operation on the shutter control 222 in FIG. 2B, the electronic device 100 starts photographing and white balances the image. As shown in FIG. 2D, due to different color temperatures of a light source in the shooting environment, a color cast occurs in an image 1 that has not been processed (the overall color of the image 1 is grayish). After the electronic device 100 wi % ite balances the image 1, the overall color of the processed image 1 is no longer grayish and is consistent with the color actually observed by the human eye.

Figure 3:
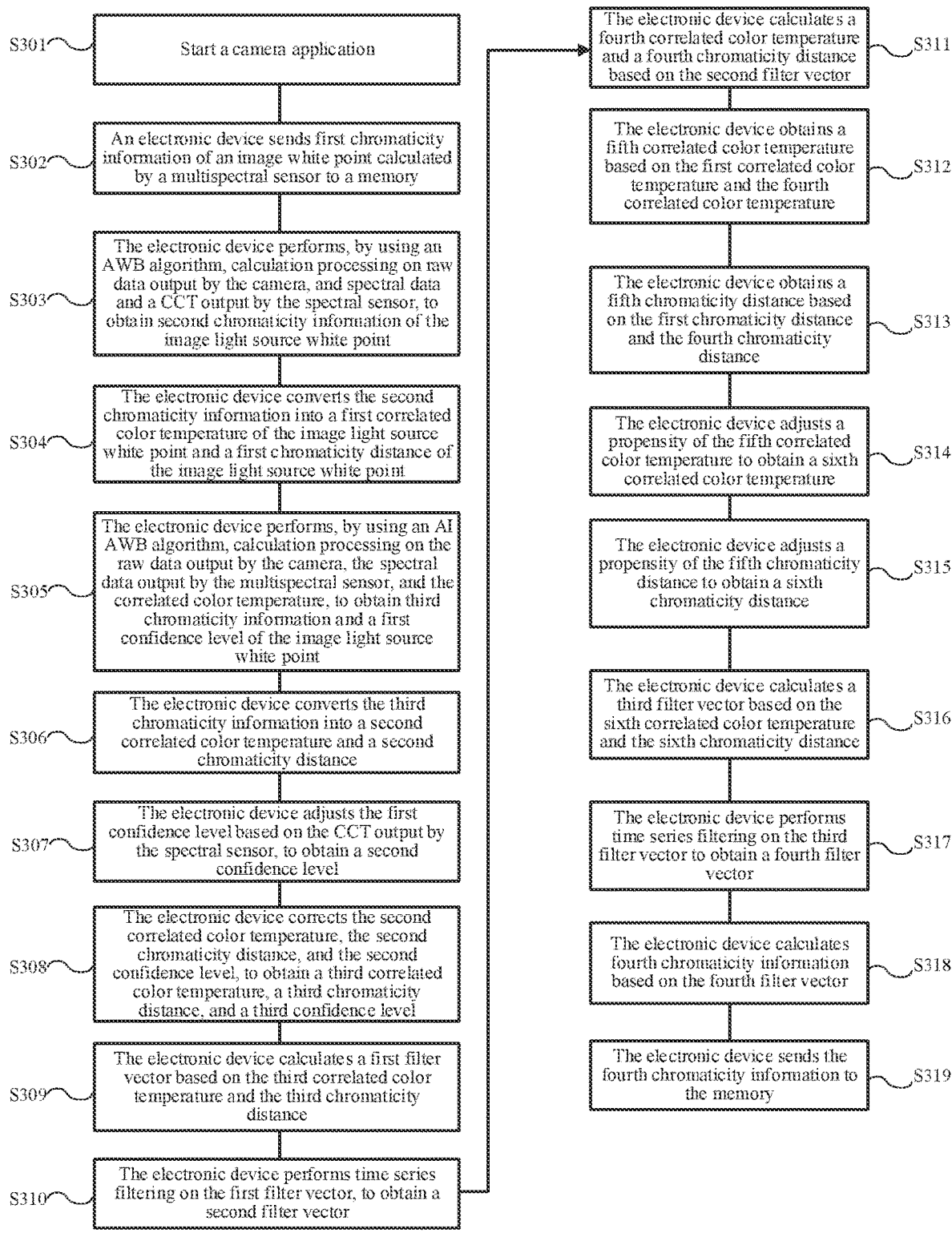
FIG. 3 is a flowchart of a method for determining chromaticity information according to an embodiment of this application.

A flowchart of a method for determining chromaticity information is described below with reference to the drawings. FIG. 3 is a flowchart of a method for determining chromaticity information according to an embodiment of this application. A specific procedure is as follows.

Step S301: A camera application is started.

For example, in the foregoing embodiment of FIG. 2A, after the electronic device detects an input operation (for example, a tap) on the camera application icon 211, the camera application is started.

Step S302: The electronic device sends first chromaticity information of a white point of an image light source that is calculated by a multispectral sensor to a memory.

Specifically, the multispectral sensor is configured to obtain spectral data of the image light source, and calculate color description values such as a correlated color temperature CCT and an RGB value of the white point of the image light source based on the spectral data, so that an ISP can perform image processing (for example, white balance the image) based on these color description values. In this embodiment of this application, a multispectral sensor including eight visible light channels (channel F1 to channel F8), one clear channel (Clear channel), and one near-infrared channel (NIR Value channel) is used as an example for description. The channels of the multispectral sensor correspond to different wavelength ranges. After a device is irradiated by light, each channel generates a channel response value within a unit time, and such response value is the spectral data obtained by the multispectral sensor. The response value of the clear channel is used to represent brightness of the image, and the response value of the near-infrared channel is used to represent intensity of infrared light. The multispectral sensor may calculate the first chromaticity information based on the obtained spectral data. The first chromaticity information may be a $R_1G_1B_1$ value of the white point of the image light source, or may be $R_1/G_1$ and $B_1/G_1$ of the white point of the image light source, or may be a chromaticity value $(u_1, v_1)$ of the white point of the image light source, which is not limited in this embodiment of this application. The $R_1G_1B_1$ value is used to represent channel response values of the white point of the image light source on the red, green, and blue color channels, and $R_1G_1B_1$ and the chromaticity value $(u_1, v_1)$ can be converted to each other.

Figure 4:
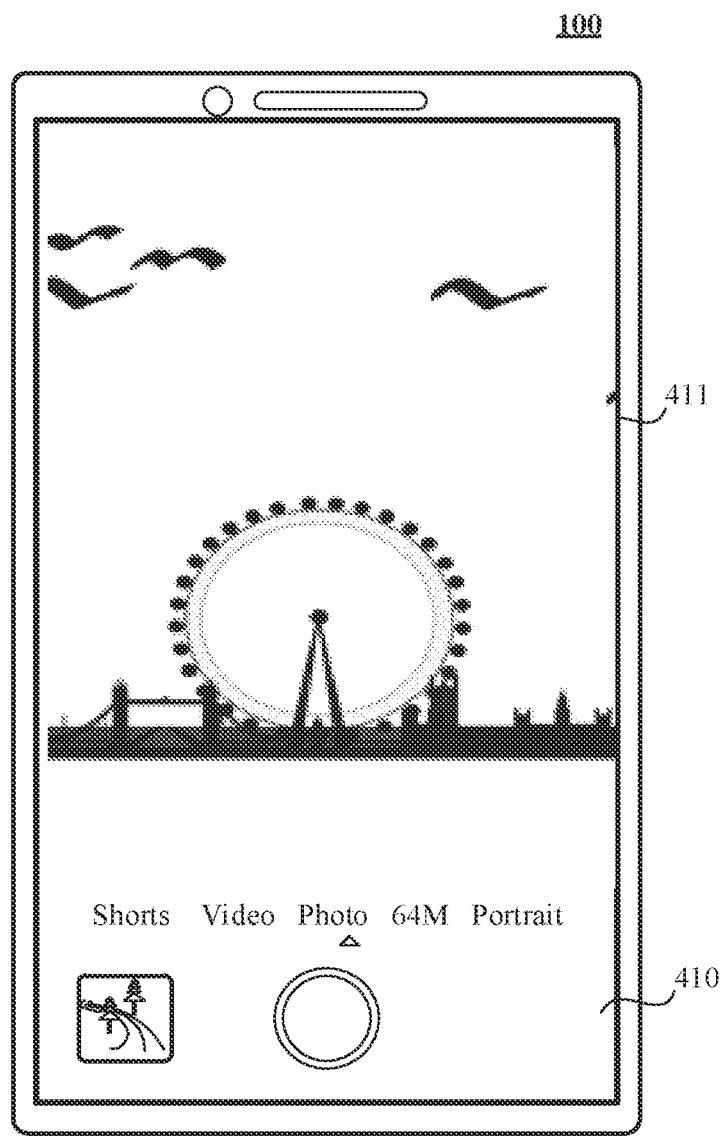
FIG. 4 is a diagram of a shooting screen according to an embodiment of this application.
Figure 5:
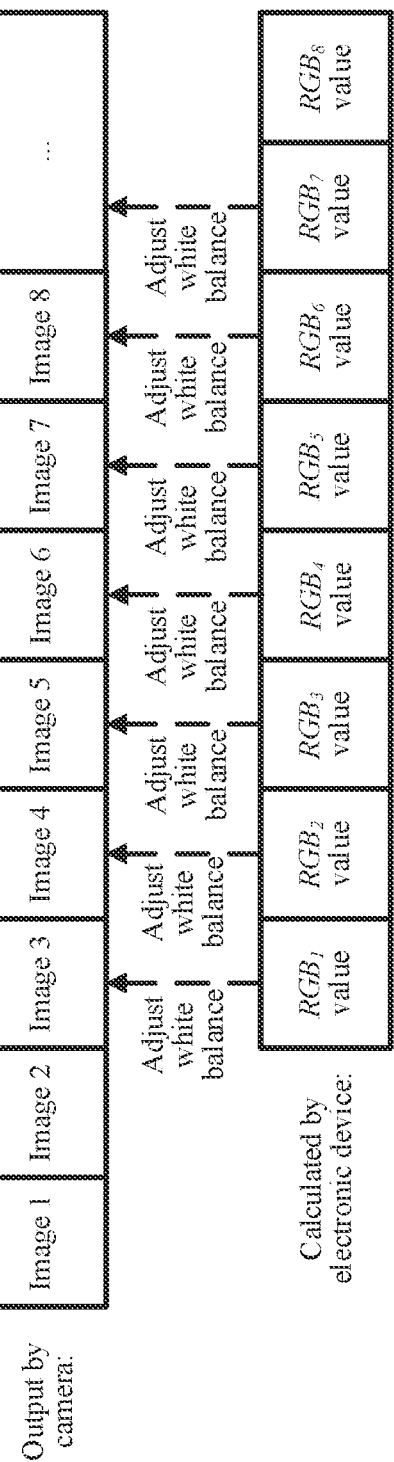
FIG. 5 is a diagram of a correspondence between preview images and corresponding adjusted RGB values according to an embodiment of this application.

During the cold start of the camera, the multispectral sensor calculates the first chromaticity information of the white point of the image light source, the spectral data, and the correlated color temperature CCT of the image light source. During the period from the start of the camera to the time of taking a photo, the multispectral sensor calculates first chromaticity information of a preview image every one or more frames, and delivers the first chromaticity information to the memory. The preview image is an image displayed in a preview screen of the electronic device after the camera application is started. For example, after the camera application is started, the electronic device displays a shooting screen 410 shown in FIG. 4. The shooting screen 410 includes a preview screen 411. The preview screen 411 is used to display a real-time image of a current shooting environment. The real-time image displayed in the preview screen 411 is presented to a user in image frames, and the image frame is the preview image. The multispectral sensor calculates spectral data and a correlated color temperature (CCT) of a light source for each frame of image, and the electronic device performs calculation on the spectral data, raw data, and the correlated color temperature of the image by using an AWB algorithm and an AI AWB algorithm, respectively, to obtain chromaticity information of each frame of image. However, the camera outputs an image faster than the electronic device calculates chromaticity information of the image by using the AWB algorithm and the AI AWB algorithm, and a startup speed of the multispectral sensor is fast. Therefore, after the camera is started, the electronic device uses the first chromaticity information calculated by the spectral sensor to white balance the first one or more frames of preview images, so that no color cast occurs in the first one or more frames of preview images. For example, as shown in FIG. 5, after the camera is started, images 1 to 8 are output in sequence. While the camera is being started, the electronic device starts to use the AWB algorithm and the AI AWB algorithm to calculate an RGB value (chromaticity information) of a white point of a light source for each frame of preview image. Because the camera outputs an image faster than the electronic device calculates the RGB value of the white point of the light source of the preview image by using the AWB algorithm and the AI AWB algorithm, when the camera outputs image 3, the electronic device calculates an $RGB_1$ value of a white point of a light source for image 1 by using the AWB algorithm and the AI AWB algorithm; and when the camera outputs image 4, the electronic device calculates an $RGB_2$ value of a white point of a light source for image 2. Because there is an extremely small timing difference between image 1 and image 3 and between image 2 and image 4, the electronic device can white balance image 3 based on the $RGB_1$ value of image 1 after outputting image 3; and the electronic device can white balance image 4 based on the $RGB_2$ value after outputting image 4. However, when the camera outputs image 1 (the first frame of image) and image 2, the electronic device has not yet calculated the RGB values of the white points of their light sources. Therefore, after the camera outputs image 1 and image 2, the electronic device uses the first chromaticity information (the RGB value) delivered from the multispectral sensor to the memory to white balance image 1 and image 2, thereby preventing color cast in image 1 and image 2.

In some shooting environments, during the process in which the camera performs, by using the AWB algorithm and the AI AWB algorithm, calculation on the raw data of the image, and the correlated color temperature CCT and spectral data that are output by the multispectral sensor, when it is detected that the number of white points of effective image light sources of the image that are near the Planckian locus is less than a first threshold, the electronic device determines that a current shooting scene is a solid-color scene. In the solid-color scene, chromaticity information of a white point of a light source, whether calculated by using the AWB algorithm or the AI AWB algorithm, is less accurate. Therefore, in the solid-color scene, the electronic device may white balance the preview image based on the first chromaticity information calculated by the multispectral sensor. The first threshold may be obtained based on an empirical value, or based on a historical value, or based on experimental data, which is not limited in this embodiment of this application.

Step S303: The electronic device performs, by using the AWB algorithm, calculation on the raw data output by the camera, and the spectral data and CCT that are output by the spectral sensor, to obtain second chromaticity information of the white point of the image light source.

Specifically, the raw data is data of a digital signal converted from an optical signal captured by a photosensitive element in the camera. The photosensitive element includes a plurality of image-sensitive elements, each image-sensitive element performs sampling and quantization to obtain an RGB value, and RGB values obtained by downsampling on the image-sensitive elements by the electronic device are the raw data.

For example, if the sensor has 6400×4800 image-sensitive elements, and the electronic device performs 100X downsampling to obtain RGB values of 64×48 image-sensitive elements, then the raw data obtained by the electronic device is a vector with a size of 64×48×3.64×48 is the number of image-sensitive elements, and 3 is an RGB value calculated for each image-sensitive element.

The electronic device uses the raw data as an input to an AWB module, and performs calculation by using the AWB algorithm to obtain the chromaticity information of the white point of the image light source. This chromaticity information is the second chromaticity information of the white point of the image light source. The second chromaticity information may be an $R_2G_2B_2$ value of the white point of the image light source, or $R_2/G_2$ and $B_2/G_2$ of the white point of the image light source, or a chromaticity value $(u_2, v_2)$ of the white point of the image light source, which is not limited in this embodiment of this application.

The spectral data includes channel response values of the eight visible light channels, a response value of the clear channel, and a response value of the near-infrared channel that are output by the multispectral sensor. A plurality of AWB algorithms are stored in the electronic device. Each AWB algorithm corresponds to a different shooting scene. The electronic device can determine a type of a current shooting scene based on the spectral data output by the multispectral sensor, and select a corresponding AWB algorithm based on the type of the current shooting scene to calculate the second chromaticity information. In this way, the calculated second chromaticity information is more accurate. For example, the electronic device can determine a plurality of shooting scenes based on the NIR values output by the NIR channel in the spectral data. Table 1 shows a correspondence among NIR values, shooting scenes, and related AWB algorithms.

TABLE 1

| NIR value | Shooting scene | AWB algorithm |
|---|---|---|
| 100-200 | Blue sky and white clouds | Algorithm 1 |
| 201-401 | Outdoor green plants | Algorithm 2 |
| 402-402 | City night | Algorithm 3 |
| ... | ... | ... |

If the NIR value is 150, the electronic device may determine, based on Table 1, that the type of the current shooting scene is blue sky and white clouds, and then select Algorithm 1 to calculate the second chromaticity information.

Step S304: The electronic device converts the second chromaticity information into a first correlated color temperature of the white point of the image light source and a first chromaticity distance of the white point of the image light source.

Specifically, the first correlated color temperature is $CCT_1$, and the first chromaticity distance is $Du_{uv1}$.

For example, a method for the electronic device to calculate $D_{uv1}$ may be as follows:

When the second chromaticity information is $R_2/G_2$ and $B_2/G_2$ or the $R_2G_2B_2$ value, the electronic device may calculate the chromaticity value $(u_2, v_2)$ of the frame of image according to the following formula (1):

$$\begin{bmatrix} u_2 \\ v_2 \end{bmatrix} = \begin{bmatrix} -0.148 & -0.289 & 0.437 \\ 0.615 & -0.515 & -0.1 \end{bmatrix} \begin{bmatrix} R_2 \\ G_2 \\ B_2 \end{bmatrix} \quad (1)$$

where $$\begin{bmatrix} -0.148 & -0.289 & 0.437 \\ 0.615 & -0.515 & -0.1 \end{bmatrix}$$

is a conversion matrix. The conversion matrix is only used as an example for description in this embodiment of this application, and specific content thereof is not limited.

Then, the electronic device obtains, from a chromaticity diagram, coordinates $(u_2', v_2')$ of a point on the Planckian locus closest to $(u_2, v_2)$. Finally, $D_{uv1}$ is calculated according to the following formula (2):

$$D_{uv1} = \text{sgn}(v_2 - v_2') * [(u_2 - u_2')^2 + (v_2 - v_2')^2]^{1/2} \quad (2)$$

When $v_2 - v_2' \geq 0$, $\text{sgn}(v_2 - v_2') = 1$; and when $v_2 - v_2' < 0$, $\text{sgn}(v_2 - v_2') = -1$.

For example, a method for the electronic device to calculate $CCT_1$ may be as follows:

When the second chromaticity information is $R_2/G_2$ and $B_2/G_2$ or $R_2G_2B_2$ value, the electronic device may calculate the chromaticity value $(u_2, v_2)$ of the frame of image according to formula (1). Then, the electronic device obtains, from the chromaticity diagram, a point M on the Planckian locus closest to $(u_2, v_2)$, where a CCT corresponding to the point M is $CCT_1$.

Step S305: The electronic device performs, by using the AI AWB algorithm, calculation on the raw data output by the camera, and the spectral data and correlated color temperature output by the multispectral sensor, to obtain third chromaticity information and a first confidence level of the white point of the image light source.

Specifically, the AI AWB algorithm includes a trained AI AWB model. After the electronic device performs calculation by using the AI AWB model, with the raw data, the spectral data, and the correlated color temperature CCT calculated by the multispectral sensor as an input, the third chromaticity information of the white point of the image light source is obtained. The third chromaticity information may be a $R_3G_3B_3$ value of the white point of the image light source, or may be $R_3/G_3$ and $B_3/G_3$ of the white point of the image light source, or may be a chromaticity value $(u_3, v_3)$ of the white point of the image light source, which is not limited in this embodiment of this application. The first confidence level is used to represent reliability of the AI AWB model.

Step S306: The electronic device converts the third chromaticity information into a second correlated color temperature and a second chromaticity distance.

Specifically, the second correlated color temperature is $CCT_2$, and the second chromaticity distance is $D_{uv2}$. For a method and process for the electronic device to calculate $CCT_2$ and $D_{uv2}$, refer to the related description of step S304 in which the electronic device converts the second chromaticity information into $CCT_1$ and $D_{uv1}$. Details are not described again in this embodiment of this application.

Step S307: The electronic device adjusts the first confidence level based on the CCT output by the multispectral sensor, to obtain a second confidence level.

Specifically, the electronic device calculates a deviation value Fn based on the CCT output by the multispectral sensor and $CCT_2$. Fh is used to represent a deviation of the CCT output by the multispectral sensor from $CCT_2$, and a larger Fn indicates a larger deviation of the CCT output by the multispectral sensor from $CCT_2$. When the deviation value exceeds a preset range, the electronic device determines that the first confidence level output by an AI AWB calculation model (for example, the AI AWB model) is inaccurate, and the electronic device adjusts the first confidence level based on Fn to obtain the second confidence level.

For example, if the preset range of Fn is 500 K, the first confidence level Conf_1 is 70%, the CCT output by the multispectral sensor is 3500 K, and $CCT_2$ is 4500 K, the deviation value Fn is 1000K. In this case, Fn exceeds the preset range, and the electronic device determines that the first confidence level output by the AI AWB model is inaccurate. The electronic device adjusts the first confidence level from 70% to 60%. Therefore, the second confidence level Conf_2 is 60%.

Step S308: The electronic device corrects the second correlated color temperature, the second chromaticity distance, and the second confidence level to obtain a third correlated color temperature, a third chromaticity distance, and a third confidence level.

Specifically, the AI AWB model in the AI AWB algorithm is a pre-trained model. During the training process, due to limited training samples, the AI AWB model cannot be applied to all shooting environments. When the user takes a photo in a scene with poor generalization, $CCT_2$, $D_{uv2}$, and Conf_2 calculated by using the AI AWB algorithm are extremely inaccurate. To effectively solve the problem, the electronic device needs to correct $CCT_2$, $D_{uv2}$, and Conf_2. When a deviation of any one of $CCT_2$, $D_{uv2}$, and Conf_2 from its correction value is too large, the electronic device can make correction, so that $CCT_2$, $D_{uv2}$, and Conf_2 fall within reasonable value ranges.

Figure 6A:
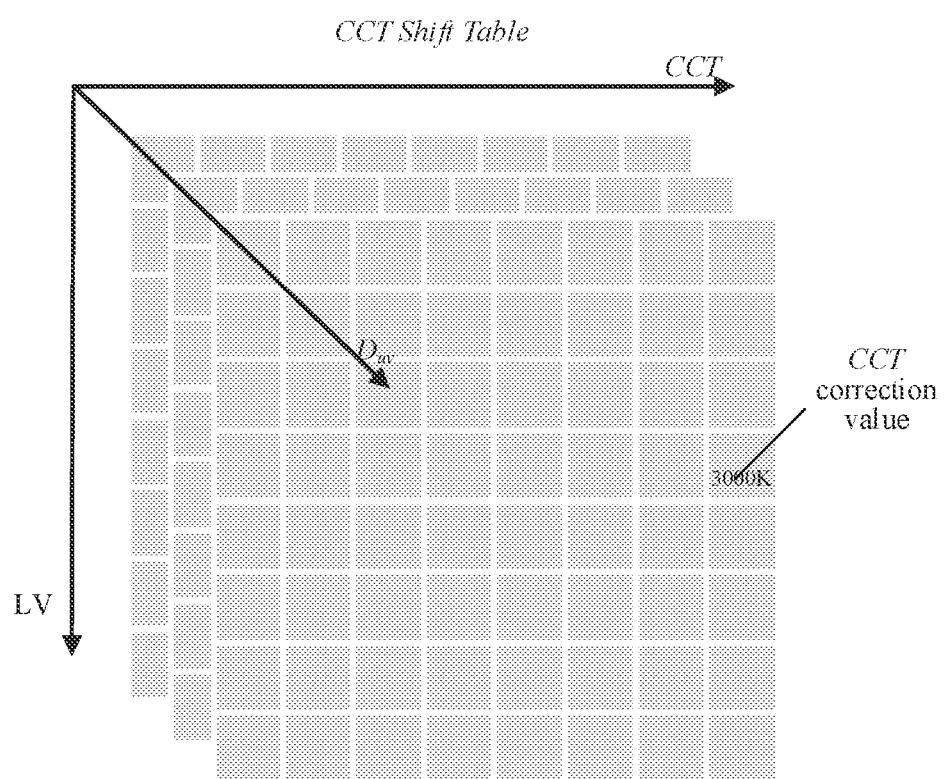
FIG. 6A shows a CCT shift table according to an embodiment of this application.

A process for the electronic device to correct $CCT_2$ is as follows: A CCT shift table (CCTShift Table) is stored in the electronic device. As shown in FIG. 6A, the CCTShili Table is a three-dimensional coordinate table having three coordinate axes: CCT axis, $D_{uv}$ axis, and LV axis. There are many cells in the three-dimensional space of the CCT Shift Table, each cell corresponding to one CCT correction value. The electronic device finds a corresponding point in the three-dimensional coordinate system of the CCT Shift Table based on an LV of the white point of the image light source, $CCT_2$, and $D_{uv2}$, and determines cells adjacent to this point. Then, the electronic device calculates a weight of each adjacent cell by Trilinear interpolation (trilinear interpolation), multiplies the weight of the cell by its corresponding CCT correction value to obtain the product of each adjacent cell, and adds up the products of all the adjacent cells to obtain $CCT_3$, where $CCT_3$ is the third correlated color temperature.

Figure 6B:
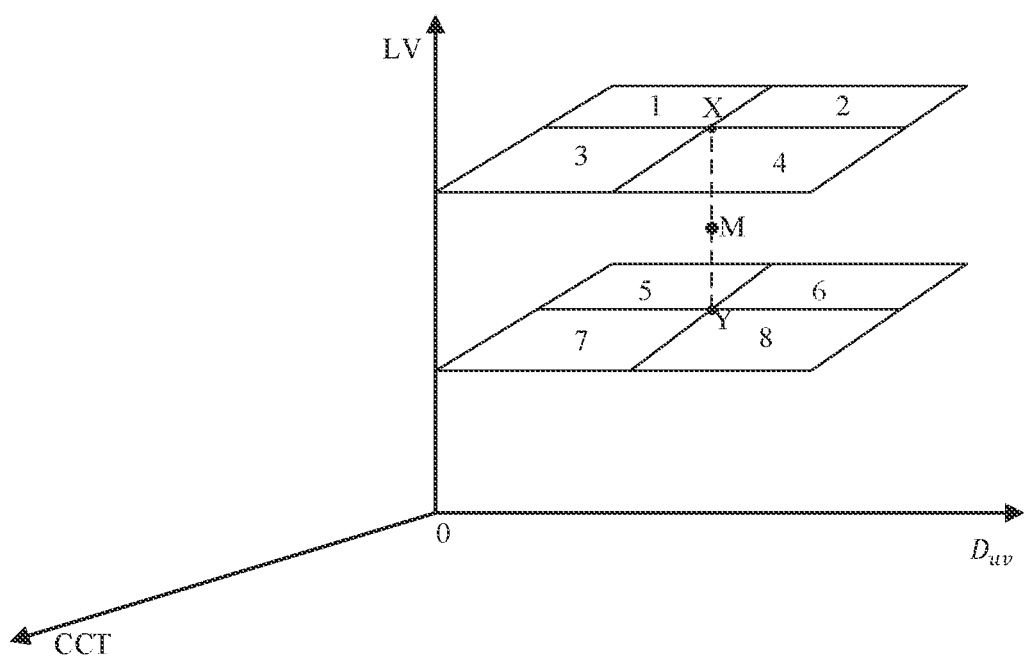
FIG. 6B shows a three-dimensional space coordinate system for a CCT shift table according to an embodiment of this application.

For example, as shown in FIG. 6B, it is assumed that the electronic device finds a point M in the three-dimensional coordinate system of the CCT Shift Table based on the LV of the white point of the image light source, $CCT_2$, and $D_{uv2}$. The point M is the midpoint of a line segment XY. X is an intersection of cells 1 to 4, and Y is an intersection of cells 5 to 8. Based on a coordinate position of the point M in the CCT Shift Table, the electronic device determines that cells 1 to 8 are adjacent cells of the point M. The electronic device performs Tilinear interpolation on cells 1 to 8 to obtain weights $f_1$ to $f_8$ of cells 1 to 8, and then calculates $CCT_3$ according to the following formula (3):

$$CCT_3 = CCT_{11}*f_1 + \ldots + CCT_{13}*f_3 + CCT_{14}*f_4 + CCT_{21}*f_5 + \ldots + CCT_{24}*f_8 \quad (3)$$

where $CCT_{11}$ to $CCT_{14}$ and $CCT_{21}$ to $CCT_{24}$ are the CCT correction values of cells 1 to 8 respectively; $f_1$ to $f_8$ are the weights of cells 1 to 8 respectively, and $f_1 + \ldots + f_8 = 1$.

Figure 7A:
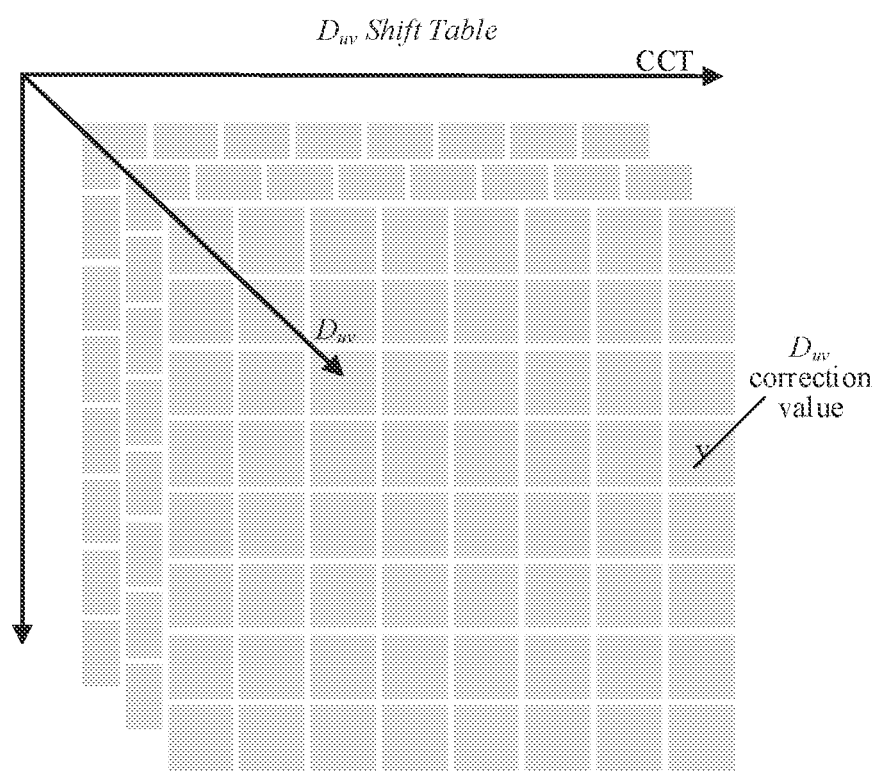
FIG. 7A shows a $D_{uv}$ shift table according to an embodiment of this application.

A process for the electronic device to correct $D_{uv2}$ is as follows: A $D_{uv}$ shift table ($D_{uv}$ Shift Table) is stored in the electronic device. As shown in FIG. 7A, the $D_{uv}$ Shift Table is a three-dimensional coordinate table having three coordinate axes: $D_{uv}$ axis, CCT axis, and LV axis. There are many cells in the three-dimensional space of the $D_{uv}$ Shift Table, each cell corresponding to one $D_{uv}$ correction value. The electronic device finds a corresponding point in the three-dimensional coordinate system of the $D_{uv}$ Shift Table based on an LV of the white point of the image light source, $D_{uv2}$, and $CCT_2$, and determines cells adjacent to this point. Each adjacent cell corresponds to one $D_{uv}$ correction value. Then, the electronic device calculates a weight of each adjacent cell by trilinear interpolation (trilinear interpolation), multiplies the weight of the cell by its corresponding $D_{uv}$ correction value to obtain the product of each adjacent cell, and adds up the products of all the adjacent cells to obtain $D_{uv3}$, where $D_{uv3}$ is the third chromaticity distance.

Figure 7B:
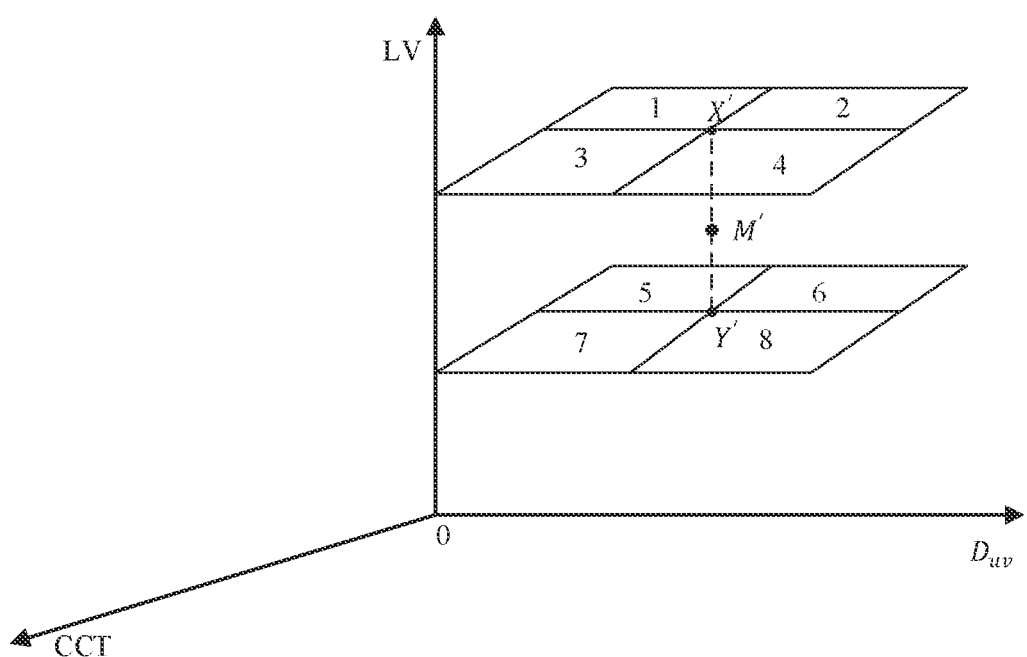
FIG. 7B shows a three-dimensional space coordinate system for a $D_{uv}$ shift table according to an embodiment of this application.

For example, as shown in FIG. 7B, it is assumed that the electronic device finds a point M' in the three-dimensional coordinate system of the $D_{uv}$ Shift Table based on the LV of the white point of the image light source, $CCT_2$, and $D_{uv2}$, where the point M' is the midpoint of a line segment X'Y'. X' is an intersection of cells 1 to 4, and Y' is an intersection of cells 5 to 8. Based on a coordinate position of the point M' in the CCT Shift Table, the electronic device determines that cells 1 to 8 are adjacent cells of the point M'. The electronic device performs Trilinear interpolation on cells 1 to 8 to obtain weights $f_1'$ to $f_8'$ of cells 1 to 8, and then calculates the third chromaticity distance according to the following formula (4):

$$D_{uv3} = D_{uv11}*f_1' + \ldots + D_{uv3}*f_3 + D_{uv14}*f_4' + D_{uv21}*f_5' + \ldots + D_{uv24}*f_8' \quad (4)$$

where $D_{uv11}$ to $D_{uv14}$ and $D_{uv21}$ to $D_{uv21}$ are the $D_{uv}$ correction values of cells 1 to 8 respectively, $f_1'$ to $f_8'$ are the weights of cells 1 to 8 respectively, $f_1' + \ldots + f_8' = 1$, and $D_{uv3}$ is the third chromaticity distance.

Figure 8A:
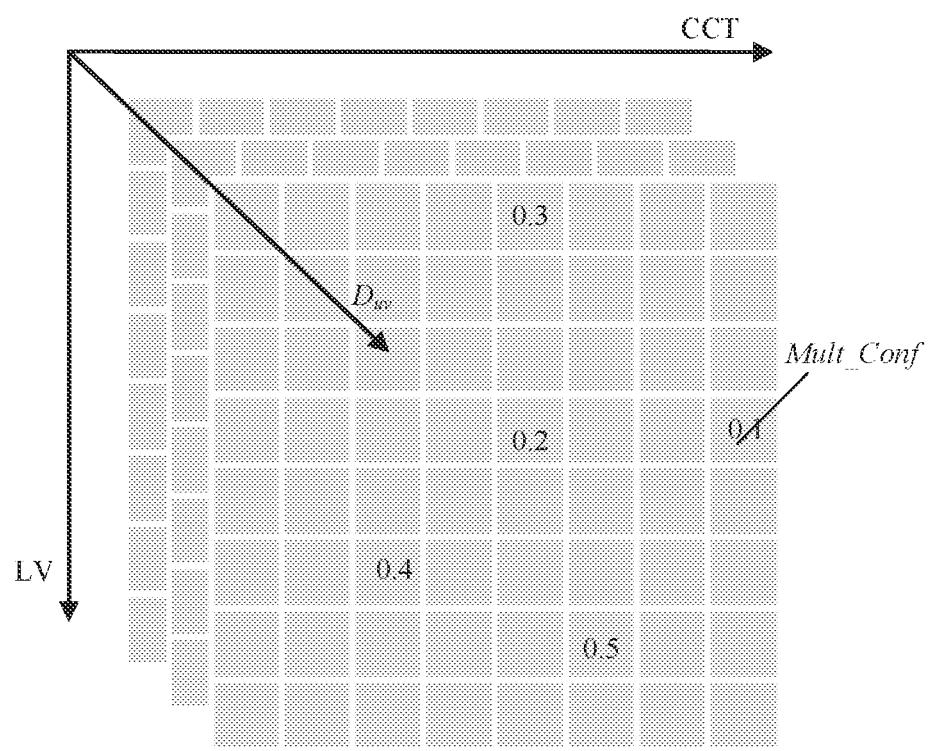
FIG. 8A shows a confidence shift table according to an embodiment of this application.

A process for the electronic device to correct Conf_2 is as follows: A confidence shift table (Confidence Shift Table) is stored in the electronic device. As shown in FIG. 8A, the Confidence Shift Table is a three-dimensional coordinate table having three coordinate axes: CCT axis, $D_{uv}$ axis, and LV axis. There are many cells in the three-dimensional space of the Confidence Shift Table, each cell corresponding to one confidence adjustment value (Mult Con/). The electronic device finds a corresponding point in the three-dimensional coordinate system of the Confidence Shift Table based on an LV of the image, $D_{uv2}$, and $CCT_2$, and determines cells adjacent to this point. Then, the electronic device calculates a weight of each adjacent cell by trilinear interpolation (trilinear interpolation), multiplies the weight of the cell by its corresponding Mult_Conf to obtain the product of each adjacent cell, and adds up the products of all the adjacent cells to obtain Mult_Conf_new. Then, the electronic device calculates the third confidence level according to a formula Conf_3=Conf_2+Mult_Conf_new. Conf_3 is the third confidence level. It should be noted that Conf_3 may be greater than 1, and when Conf_3 is greater than 1, the electronic device sets Conf_3 to 1; when Conf_3 is less than 0, the electronic device sets Conf_3 to 0.

Figure 8B:
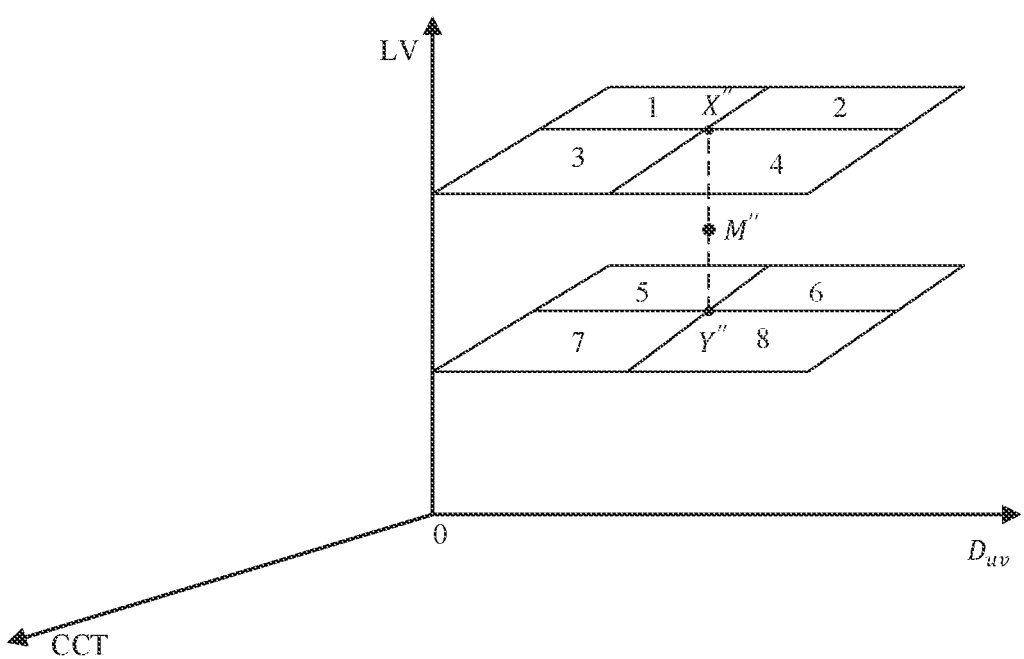
FIG. 8B shows a three-dimensional space coordinate system for a confidence shift table according to an embodiment of this application.

For example, as shown in FIG. 8B, it is assumed that the electronic device finds a point M" in the three-dimensional coordinate system of the Confidence Shift Table based on the LV of the white point of the image light source, $CCT_2$, and $D_{uv2}$, where the point M" is the midpoint of a line segment X"Y". X" is an intersection of cells 1 to 4, and Y" is an intersection of cells 5 to 8. Based on a coordinate position of the point M" in the Confidence Shift Table, the electronic device determines that cells 1 to 8 are adjacent cells of the point M". The electronic device performs trilinear interpolation to calculate weights $f_1'$ to $f_8'$ of cells 1 to 8, and then calculates Mult_Conf_new according to the following formula (5):

$$\text{Mult\_Conf\_new} = \text{Mult\_Conf}_{11} * f_1" + \ldots + \text{Mult\_Conf}_{14} * f_4" + \text{Mult\_Conf}_{21} * f_5" + \ldots + \text{Mult\_Conf}_{24} * f_8" \quad (5)$$

where $\text{Mult\_Conf}_{11}$ to $\text{Mult\_Conf}_{14}$ and $\text{Mult\_Conf}_{21}$ to $\text{Mult\_Conf}_{24}$ are the confidence adjustment values of cells 1 to 8 respectively, $f_1"$ to $f_8"$ are the weights of cells 1 to 8 respectively, and $f_1" + \ldots + f_8" = 1$.

Finally, the electronic device obtains the third confidence level according to the formula Conf_3=Mult_Conf_new+Conf_2.

Step S309: The electronic device calculates a first filter vector based on the third correlated color temperature and the third chromaticity distance.

Specifically, after correcting $CCT_2$, $D_{uv2}$, and Conf_2, the electronic device obtains $CCT_3$ and $D_{uv3}$. The electronic device converts $CCT_3$ and $D_{uv3}$ into the first filter vector $Mu_1$ for time series filtering.

$Mu_1$ is within $[\log(R_4/G_4), \log(B_4/G_4)]$, and $Mu_1$ includes chromaticity information (a $R_4B_4G_4$ value) of the white point of the image light source.

Figure 9:
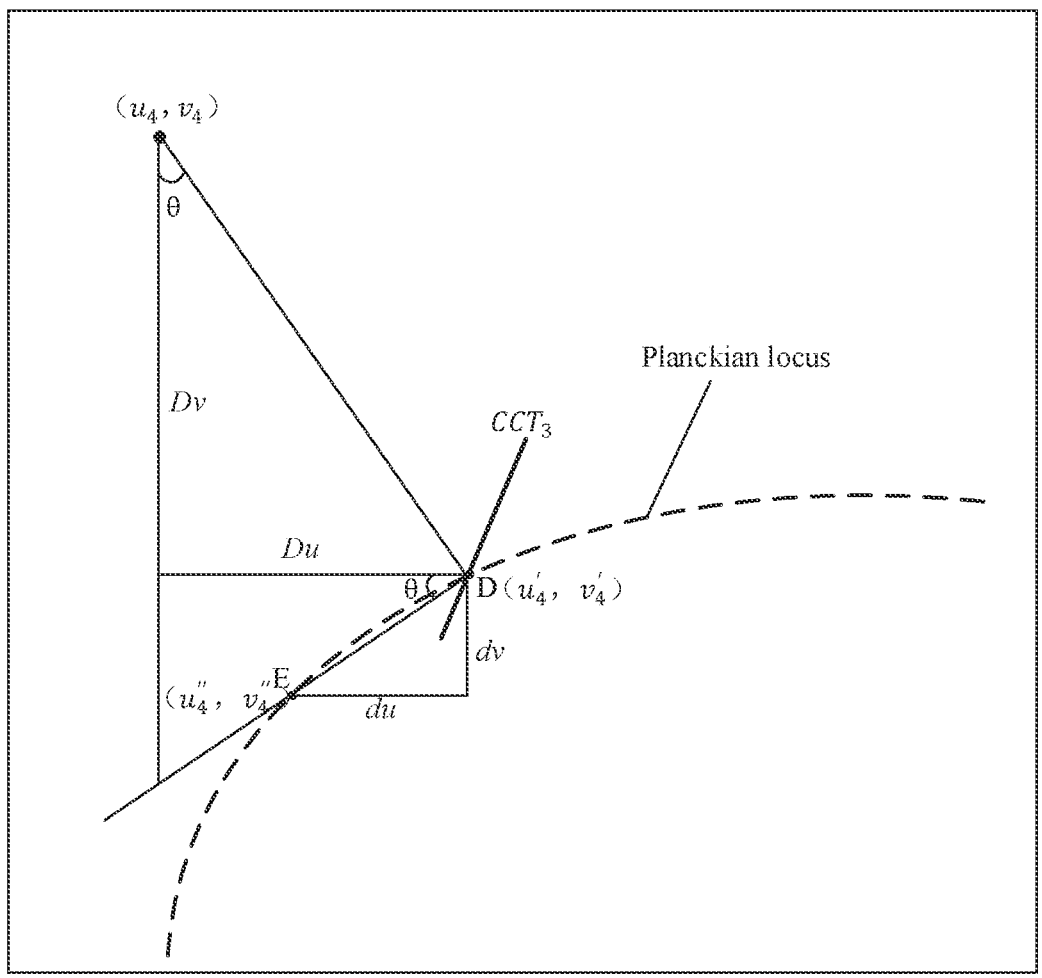
FIG. 9 is a schematic diagram of converting (CCT, $D_{uv}$) into chromaticity information according to an embodiment of this application.

For example, a process for the electronic device to obtain $Mu_1$ based on $CCT_3$ and $D_{uv3}$ is shown in FIG. 9. The electronic device determines a point D on the Planckian locus of the chromaticity diagram based on $CCT_3$, where a chromaticity value of the point D is $(u_4', v_4')$. Then, the electronic device calculates coordinates $(u_4", v_4")$ of a point E having a correlated color temperature of $CCT_3+\Delta T$ on the Planckian locus. $\Delta T$ is a small increment in $CCT_3$ (for example, $\Delta T=0.001K$). Then, the electronic device calculates an inclination angle θ, and obtains du, dv, sin θ, and cos θ according to the following formula (6) to formula (9):

$$du = u_4' - u_4" \quad (6);$$

$$dv = v_4' - v_4" \quad (7);$$

$$\sin\theta = \frac{dv}{\sqrt{du^2 + dv^2}}; \quad (8)$$

$$\cos\theta = \frac{du}{\sqrt{du^2 + dv^2}}; \quad (9)$$

Then, the electronic device calculates a chromaticity value $(u_4, v_4)$ according to the following formula (10) and formula (11):

$$u_3 = u_4' - D_{uv3} * \sin\theta \quad (10);$$

$$v_3 = v_4' + D_{uv3} * \cos\theta \quad (11);$$

Then, the electronic device calculates $R_4G_4B_4$ according to the following formula (12)

$$\begin{bmatrix} R_4 \\ G_4 \\ B_4 \end{bmatrix} = \begin{bmatrix} 0 & 1.14 \\ -0.395 & -0.583 \\ 2.032 & 0 \end{bmatrix} \begin{bmatrix} u_4 \\ v_4 \end{bmatrix} \quad (12)$$

where $$\begin{bmatrix} 0 & 1.14 \\ -0.395 & -0.581 \\ 2.032 & 0 \end{bmatrix}$$

is a conversion matrix. The conversion matrix is only used as an example for description in this embodiment of this application, and specific content of the conversion matrix is not limited.

Finally, the electronic device calculates the first filter vector $Mu_1$ based on the $R_4G_4B_4$ value.

Step S310: The electronic device performs time series filtering on the first filter vector to obtain a second filter vector.

Specifically, time series filtering is to merge a plurality of frames of signals in a time series into a plurality of frames of stable signals. The electronic device performs time series filtering to merge the chromaticity information of the frame of image and chromaticity information of a previous frame of image to obtain merged chromaticity information, so as to improve the accuracy of the third chromaticity information of the frame of image.

In this embodiment of this application, for example, the electronic device uses a Kalman filter to perform time series filtering on $Mu_1$. A process of time series filtering on $Mu_1$ is as follows: The electronic device first obtains a first covariance matrix $Sigma_1$, where $Sigma_1$ is used to represent reliability of the chromaticity information of the white point of the light source in the frame of image output by the AI AWB model, and the reliability and the confidence level can be converted into each other. $Sigma_1$ may be output by the AI AWB model, or the electronic device calculates $Sigma_1$ based on Conf_3. Then, the electronic device updates $Sigma_1$ according to the following formula (13), to obtain an updated $Sigma_1$:

$$Sigma_1' = Sigma_1 + \lambda_1 * \begin{bmatrix} 1 & 0 \\ 0 & 1 \end{bmatrix}; \quad (13)$$

where $Sigma_1'$ is the updated $Sigma_1$, and $\lambda_1$ is a first parameter.

Then, the electronic device updates a second covariance matrix $Sigma_2$ according to the following formula (14), where $Sigma_2$ is a covariance matrix obtained by calculating the chromaticity information of the white point of the light source in the previous frame of image using the AI AWB model:

$$Sigma_2' = Sigma_2 + \lambda_2 * \begin{bmatrix} 1 & 0 \\ 0 & 1 \end{bmatrix}; \quad (14)$$

where $Sigma_2'$ is the updated $Sigma_2$, and $\lambda_2$ is a second parameter. $\lambda_1$ and $\lambda_2$ may be obtained based on empirical values, or based on historical data, or based on experimental test data, which is not limited in this embodiment of this application.

Finally, the electronic device performs time series filtering on $M_{u1}$ according to the following formula (15), to obtain the second filter vector Mu:

$$Mu=Mu_1*(Sigma_1')^{-1}+Mu_2*(Sigma_2')^{-1} \quad (15)$$

where $Mu_2$ is the filter vector of the previous frame of image, and Mu is the second filter vector.

Step S311: The electronic device calculates a fourth correlated color temperature and a fourth chromaticity distance based on the second filter vector.

Specifically, after calculating Mu, the electronic device may calculate a $R_5G_5B_5$ value of the white point of the image light source based on Mu, and convert the $R_5G_5B_5$ value into the fourth correlated color temperature $CCT_4$ and the fourth chromaticity distance $D_{uv4}$. For a process for the electronic device to convert $R_5G_5B_5$ value into $CCT_4$ and $D_{uv4}$, refer to the related description of step S303 in which the electronic device converts the second chromaticity information into $CCT_1$ and $D_{uv1}$. Details are not described again in this embodiment of this application. The accuracy of $CCT_4$ and $Du_{14}$ are higher than that of $CCT_3$ and $D_{uv3}$.

Step S312: The electronic device obtains a fifth correlated color temperature based on the first correlated color temperature and the fourth correlated color temperature.

Figure 10:
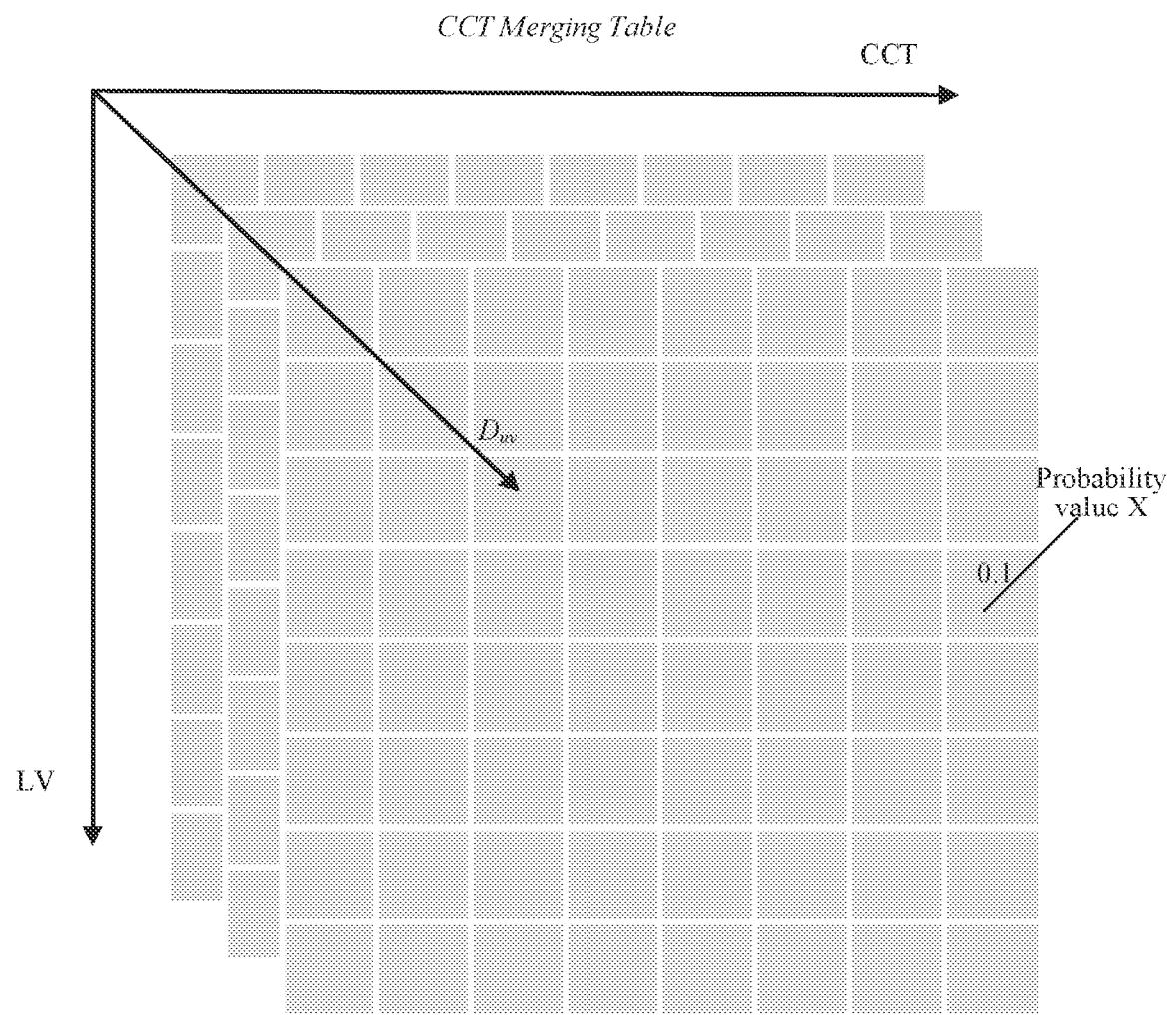
FIG. 10 shows a CCT merging table according to an embodiment of this application.

Specifically, a correlated color temperature merging table (CCT Merging Table) is stored in the electronic device. As shown in FIG. 10, the CCT Merging Table is a three-dimensional coordinate table having three coordinate axes: $D_{uv}$ axis, CCT axis, and LV axis. There are many cells in the three-dimensional space of the CCT Merging Table, each cell corresponding to one probability value X. The electronic device finds a corresponding point in the three-dimensional coordinate system of the CCT Merging Table based on an LV of the image, $CCT_4$, and $D_{uv4}$, and determines cells adjacent to this point. Then, the electronic device calculates a weight of each adjacent cell by trilinear interpolation (trilinear interpolation), multiplies the weight of the cell by its corresponding probability value X to obtain the product of each adjacent cell, and adds up the products of all the adjacent cells to obtain a first probability value X'. Finally, the electronic device calculates the fifth correlated color temperature $CCT_5$ according to the following formula (16):

$$CCT_5=Conf\_3*X'*CCT_4+(1-Conf\_3*X')*CCT_1 \quad (16)$$

Step S313: The electronic device obtains a fifth chromaticity distance based on the first chromaticity distance and the fourth chromaticity distance.

Figure 11:
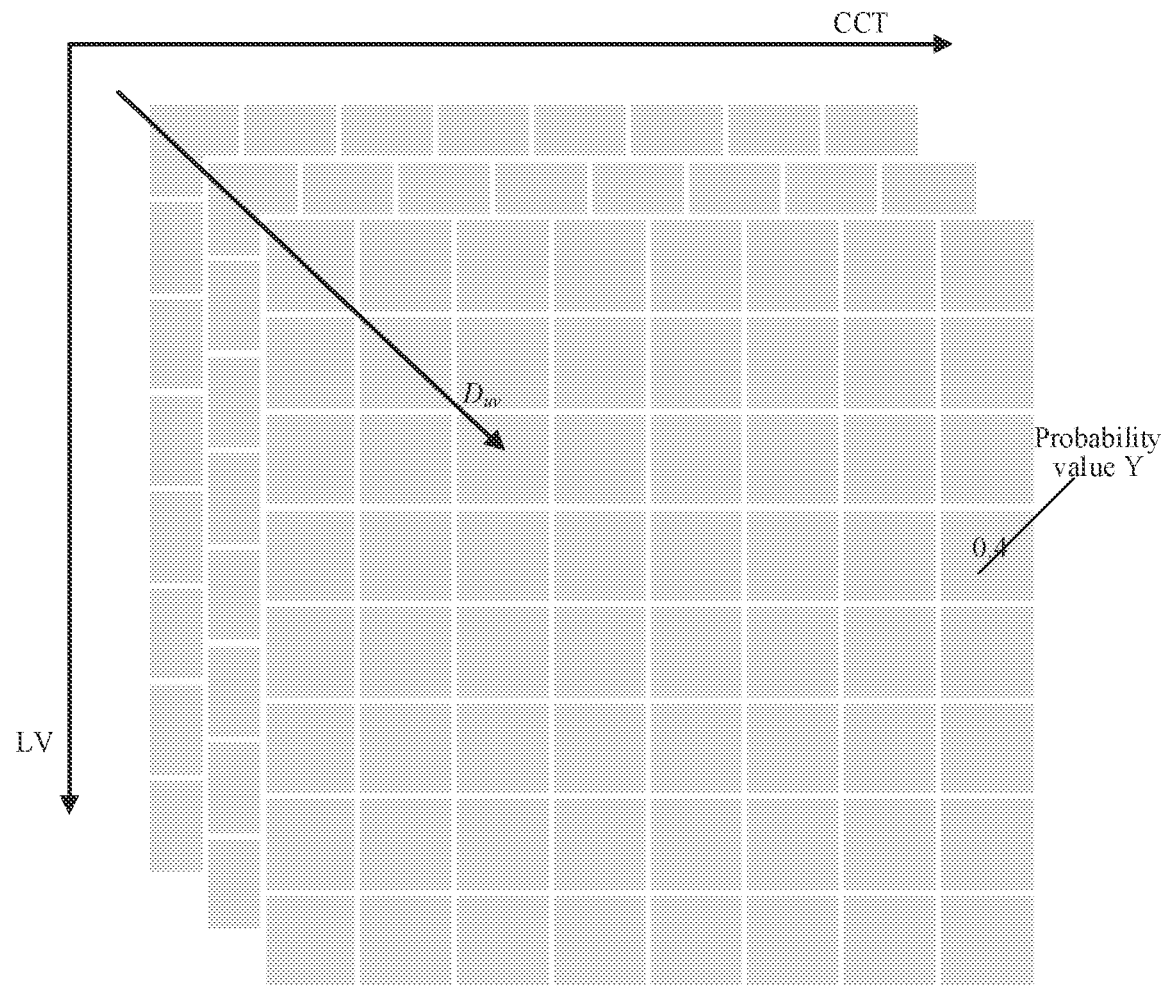
FIG. 11 shows a $D_{uv}$ merging table according to an embodiment of this application.

Specifically, a chromaticity distance merging table ($D_{uv}$ Merging Table) is stored in the electronic device. As shown in FIG. 11, the $D_{uv}$ Merging Table is a three-dimensional coordinate table having three coordinate axes: $D_{uv}$ axis, CCT axis, and LV axis. There are many cells in the three-dimensional space of the $D_{uv}$ Merging Table, each cell corresponding to one probability value Y The electronic device finds a corresponding point in the three-dimensional coordinate system of the $D_{uv}$ Merging Table based on an LV of the image, $CCT_4$, and $D_{uv4}$, and determines cells adjacent to this point. Then, the electronic device calculates a weight of each adjacent cell by trilinear interpolation (trilinear interpolation), multiplies the weight of the cell by its corresponding probability value Y to obtain the product of each adjacent cell, and adds up the products of all the adjacent cells to obtain a second probability value Y'. Finally, the electronic device calculates the fifth chromaticity distance $D_{uv5}$ according to the following formula (17):

$$D_{uv5}=Conf\_3*Y'*D_{uv4}+(1-Conf\_3*Y')*D_{uv1} \quad (17)$$

Step S314: The electronic device adjusts a propensity of the fifth correlated color temperature to obtain a sixth correlated color temperature.

Figure 12:
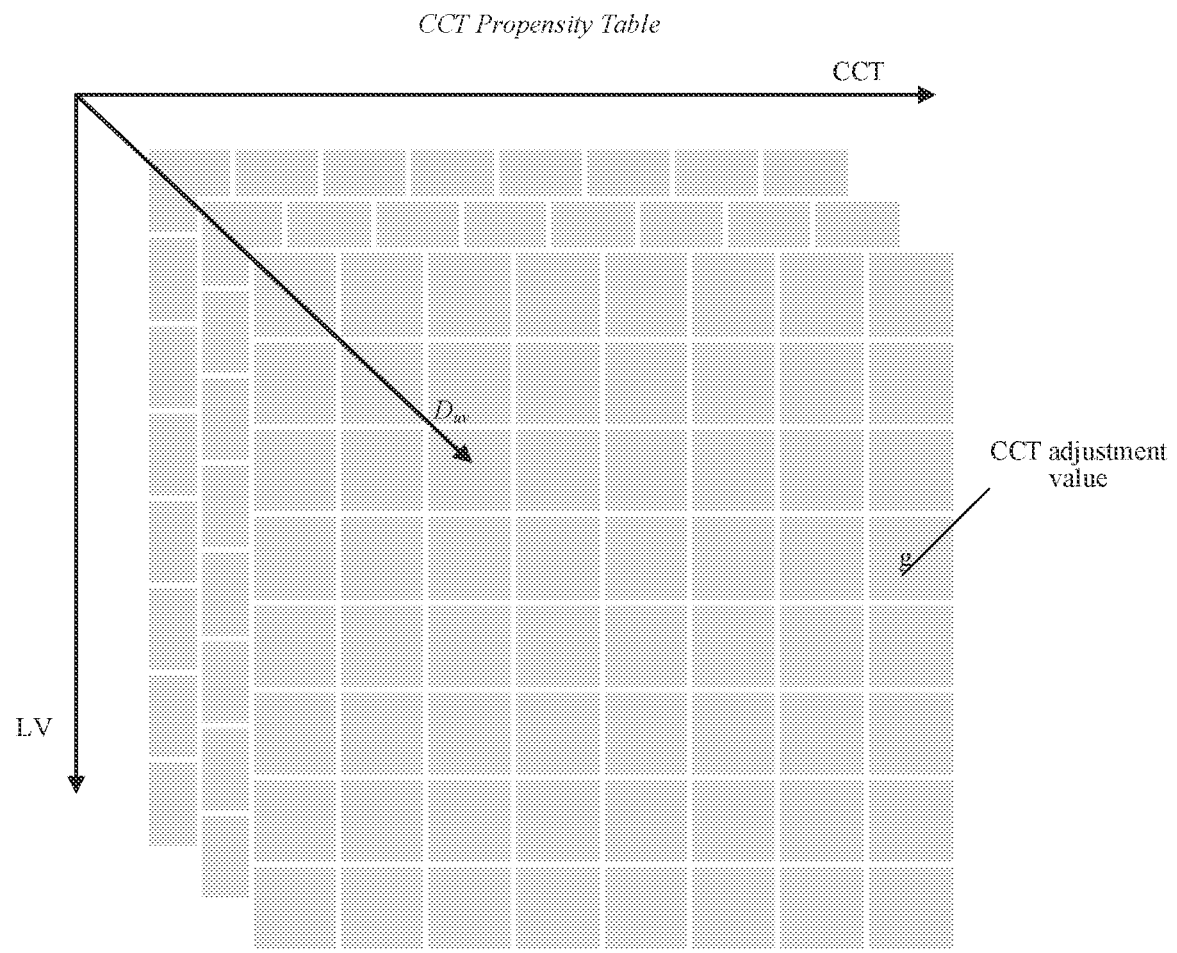
FIG. 12 shows a CCT propensity table according to an embodiment of this application.

Specifically, after a photo is taken using an electronic device, some users have other requirements for a color of the image. For example, some users want the overall color of the image to be warm, while some users want the overall color of the image to be cold. To make the overall color of the image more inclined to the color desired by the user, the electronic device needs to adjust propensities of $CCT_5$ and $D_{uv5}$. A specific process for the electronic device to adjust the propensity of $CCT_5$ is as follows: A CCT Propensity Table (correlated color temperature propensity adjustment table) shown in FIG. 12 is stored in the electronic device. The CCT Propensity Table is a three-dimensional coordinate table having three coordinate axes: CCT axis, $D_{uv}$ axis, and LV axis. There are many cells in the three-dimensional space of the CCT Propensity Table, each cell corresponding to one CCT adjustment value (Delta_CCT). The electronic device finds a corresponding point in the three-dimensional coordinate system of the CCT Propensity Table based on an LV of the image, $CCT_5$, and $D_{uv5}$, and determines cells adjacent to this point. Then, the electronic device calculates a weight of each adjacent cell by Trilinear interpolation (trilinear interpolation), multiplies the weight of the cell by its corresponding Delta_CCT to obtain the product of each adjacent cell, and adds up the products of all the adjacent cells to obtain a first correlated color temperature adjustment value Delta_CCT'. Then, the electronic device calculates the sixth correlated color temperature according to the following formula (18):

$$CCT_6=CCT_5+Delta\_CCT' \quad (18)$$

In formula (18), $CCT_6$ is the sixth correlated color temperature.

Step S315: The electronic device adjusts a propensity of the fifth chromaticity distance to obtain a sixth chromaticity distance.

Figure 13:
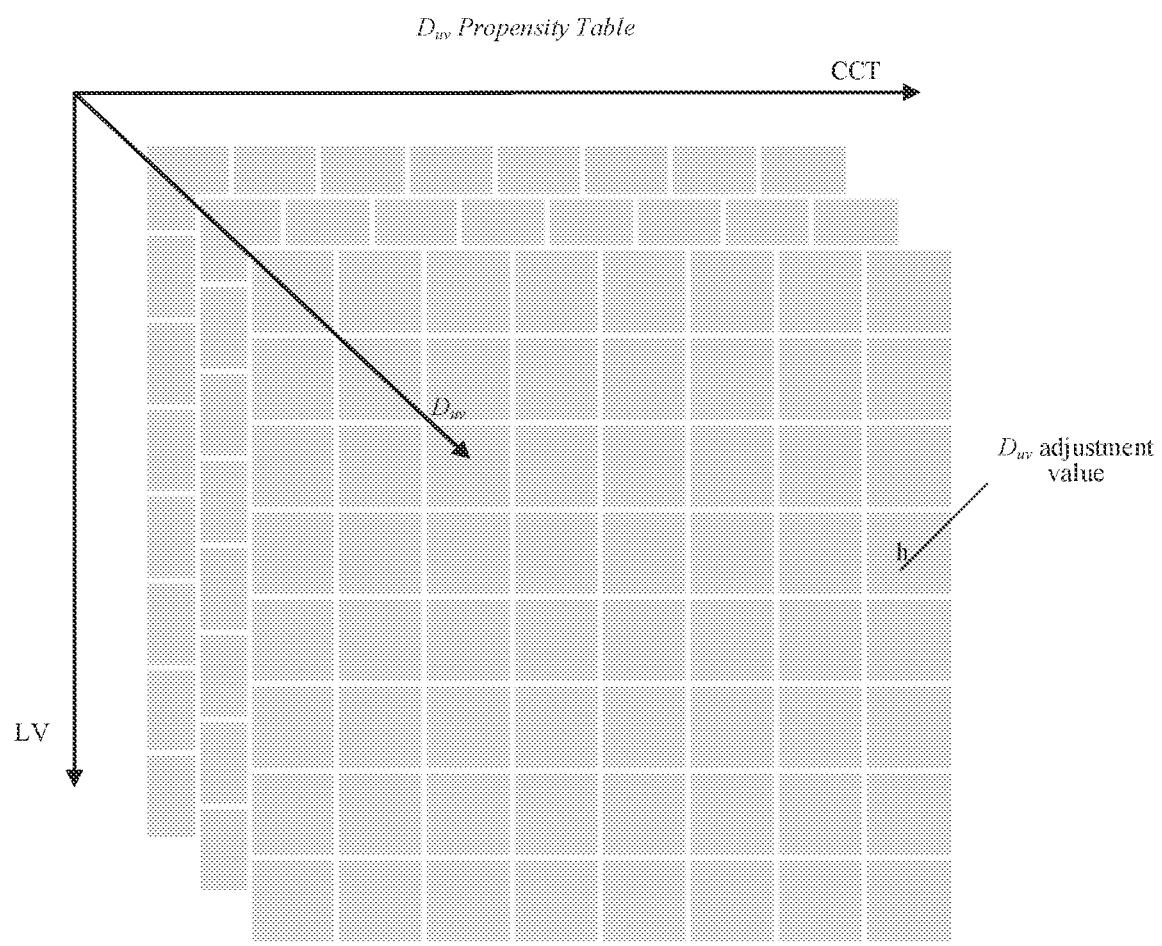
FIG. 13 shows a $D_{uv}$ propensity table according to an embodiment of this application.

Specifically, a specific process for the electronic device to adjust the propensity of $D_{uv5}$ is as follows: A $D_{uv}$ Propensity Table (chromaticity distance propensity adjustment table) shown in FIG. 13 is stored in the electronic device. The $D_{uv}$ Propensity Table is a three-dimensional coordinate table having three coordinate axes: CCT axis, $D_{uv}$ axis, and LV axis. There are many cells in the three-dimensional space of the $D_{uv}$ Propensity Table, each cell corresponding to one $D_{uv}$ adjustment value (Delta_$D_{uv}$). The electronic device finds a corresponding point in the three-dimensional coordinate system of the $D_{uv}$ Propensity Table based on an LV of the image, $D_{uv5}$, and $CCT_5$, and determines cells adjacent to this point. Then, the electronic device calculates a weight of each adjacent cell by Trilinear interpolation (trilinear interpolation), multiplies the weight of the cell by its corresponding Delta_$D_{uv}$ to obtain the product of each adjacent cell, and adds up the products of all the adjacent cells to obtain a first chromaticity distance adjustment value Delta_$D_{uv}$'. Then, the electronic device calculates an adjusted chromaticity distance according to the following formula (19):

$$D_{uv6}=D_{uv5}+Delta\_D_{uv}' \quad (19)$$

In formula (19), $D_{uv6}$ is the sixth chromaticity distance.

Step S316: The electronic device calculates a third filter vector based on the sixth correlated color temperature and the sixth chromaticity distance.

Specifically, the third filter vector is $Mu_3$. For a method for the electronic device to calculate $Mu_3$ based on $CCT_6$ and $D_{uv6}$, refer to the related description of step S309 in which the electronic device calculates $Mu_1$ based on $CCT_3$ and $D_{uv3}$. Details are not described again in this embodiment of this application.

Step S317: The electronic device performs time series filtering on the third filter vector to obtain a fourth filter vector.

Specifically, to prevent a sudden change in colors oftwo adjacent frames of images caused by largely different chromaticity information of the two adjacent frames of images, the electronic device performs time series filtering on a filter vector for the current frame of image and a filter vector for the previous frame of image, so as to obtain a merged filter vector (the fourth filter vector). The electronic device can obtain the fourth chromaticity information based on the fourth filter vector. In this way, after the electronic device white balances the current frame of image by using the fourth chromaticity information, the overall color of the adjusted image is not significantly different from the overall color of the previous frame of image, without causing sudden change to colors of the two adjacent frames of images. First, the electronic device updates the first covariance matrix of the image according to the following formula (20), to obtain a third covariance matrix:

$$Sigma_3 = Sigma_1 + a_1 * \begin{bmatrix} 1 & 0 \\ 0 & 1 \end{bmatrix}; \qquad (20)$$

where $Sigma_3$ is the third covariance matrix, $Sigma_1$ is the first covariance matrix, and $a_1$ is a third parameter.

Then, the electronic device updates the second covariance matrix according to the following formula (21), to obtain a fourth covariance matrix:

$$Sigma_4 = Sigma_2 + a_1 * \begin{bmatrix} 1 & 0 \\ 0 & 1 \end{bmatrix}; \qquad (21)$$

where $Sigma_4$ is the fourth covariance matrix, $Sigma_2$ is the second covariance matrix, and $a_1$ is a third parameter, $a_1$ may be obtained based on a historical value, or based on an empirical value, or based on experimental data, which is not limited in this embodiment of this application.

Then, the electronic device performs time series filtering on $Mu_3$ according to the following formula (22), to obtain the fourth filter vector $Mu_5$:

$$Mu_5 = Mu_3 ** (Sigma_3)^{-1} + Mu_4 * (Sigma_4)^{-1} \qquad (22)$$

where $Mu_4$ is the filter vector for the previous frame of image, and $Mu_4$ is calculated by the electronic device based on $CCT_2'$ and $D'_{uv2}$. $CCT_2'$ is a correlated color temperature of the previous frame of image after the CCT propensity adjustment, and $D'_{uv2}$ is a chromaticity distance of the previous frame of image after the $D_{uv}$ propensity adjustment.

Step S318: The electronic device calculates the fourth chromaticity information based on the fourth filter vector.

Specifically, $Mu_5 = [\log(R_6/G_6), \log(B_6/G_6)]$. The fourth chromaticity information may be a $R_6G_6B_6$ value of the white point of the image light source, or $R_6/G_6$ and $B_6/G_6$ of the white point of the image light source, which is not limited in this embodiment of this application.

Step S319: The electronic device sends the fourth chromaticity information to the memory.

Specifically, the fourth chromaticity information is used to adjust the color of the image in a non-solid-color scene.

In this embodiment of this application, the electronic device selects a corresponding AWB algorithm based on the spectral data output by the multispectral sensor to calculate the second chromaticity information, thereby increasing the accuracy of the first correlated color temperature and first chromaticity distance calculated based on the second chromaticity information. The electronic device adjusts a confidence level output by the AI AWB algorithm based on the CCT output by the multispectral sensor, thereby increasing the accuracy of the confidence level. Because the accuracy of the first correlated color temperature, first chromaticity distance, and confidence level output by the AI AWB algorithm is increased, the accuracy of the fifth correlated color temperature obtained after the electronic device merges the first correlated color temperature and the fourth correlated color temperature calculated based on the AI AWB algorithm is also increased, and the accuracy of the fifth chromaticity distance obtained after the electronic device merges the first chromaticity distance and the fourth chromaticity distance calculated based on the AI AWB algorithm is also increased. As a result, the accuracy of the fourth chromaticity information that is calculated based on the fifth correlated color temperature and the fifth chromaticity distance and that is delivered to the memory is also increased. Because the accuracy of the fourth chromaticity information is increased, a better effect is achieved when the electronic device white balances the image by using the fourth chromaticity information. In addition, the multispectral sensor delivers the calculated first chromaticity value of the image to the memory throughout the period from the cold start of the camera to the shooting of the electronic device. During the cold start process of the camera, because the camera outputs images faster, the electronic device may use the first chromaticity information to white balance the first one or more frames of images, thereby avoiding color cast in the first one or more frames of images. Alternatively, when the electronic device detects that a current shooting scene is a solid-color scene (the number of white points of the image light source is insufficient), because the accuracy of the fourth chromaticity information calculated by using the AWB algorithm and the AI AWB algorithm is not high, the electronic device may also invoke the first chromaticity information to white balance the image.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on the computer, the procedures or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium(for example, a DVD), a semiconductor medium (for example, a solid-state drive (solid state disk)), or the like.

Persons of ordinary skill in the art can understand that some or all of the procedures in the foregoing embodiment of the method can be implemented by a computer program instructing relevant hardware. The program may be stored in a computer-readable storage medium. The program, when executed, may include the procedures of the foregoing method embodiments. The foregoing storage medium includes various media that can store program code, such as a ROM or a random access memory RAM, a magnetic disk, or an optical disc.

In short, the foregoing description is merely embodiments of the technical solutions of the present invention, and is not intended to limit the protection scope of the present invention. Any modifications, equivalent replacements, improvements, or the like made according to the disclosure of the present invention shall fall within the protection scope of the present invention.

What is claimed is:

1. A method for determining chromaticity information, applied to an electronic device, wherein the electronic device comprises a camera, a multispectral sensor, an automatic white balance module configured to implement a plurality of algorithms, and an artificial intelligence (AI) automatic white balance module, the method comprising:
   starting, by the electronic device, a camera application;
   obtaining, by a first channel of the multispectral sensor, a first channel value;
   sending the first channel value to the automatic white balance module;
   selecting, by the automatic white balance module, a target algorithm from the plurality of algorithms based on the first channel value; and
   determining, by the electronic device based on the target algorithm, target chromaticity information.

2. The method of claim 1, further comprising:
   obtaining, by the multispectral sensor, a first correlated color temperature;
   sending the first correlated color temperature to the AI automatic white balance module;
   determining, by the AI automatic white balance module, a difference between the first correlated color temperature and a second correlated color temperature, wherein the second correlated color temperature is a correlated color temperature value obtained by the AI automatic white balance module based on an image acquired by the camera;
   adjusting a confidence level output by the AI automatic white balance module to a first confidence level when the difference is greater than a preset threshold; and
   determining, by the electronic device based on the first confidence level, target chromaticity information.

3. The method of claim 1, further comprising:
   obtaining, by the multispectral sensor, first chromaticity information when the start is a cold start; and
   determining, by the electronic device, the target chromaticity information am being the first chromaticity information.

4. The method of claim 2, further comprising determining, by the electronic device, that the target chromaticity information is second chromaticity information when the automatic white balance module or the AI automatic white balance module determines that the image acquired by the camera is a solid-color image, wherein the second chromaticity information is chromaticity information obtained by the multispectral sensor.

5. The method of claim 1, wherein the first channel value comprises one or more of the following: a visible light channel value, a near-infrared (NIR) channel value, and a clear channel value.

6. The method of claim 2, wherein determining, by the electronic device based on the first confidence level, target chromaticity information comprises:
   performing, by the automatic white balance module by using the target algorithm, calculation on the image acquired by the camera, to obtain a third correlated color temperature and a first chromaticity distance;
   obtaining, by the AI automatic white balance module based on the image acquired by the camera, a fourth correlated color temperature and a second chromaticity distance;
   correcting, by the electronic device, the first confidence level to obtain a second confidence level;
   merging, by the electronic device based on the second confidence level, the third correlated color temperature and the fourth correlated color temperature to obtain a fifth correlated color temperature;
   merging, by the electronic device based on the second confidence level, the first chromaticity distance and the second chromaticity distance to obtain a third chromaticity distance; and
   obtaining, by the electronic device based on the fifth correlated color temperature and the third chromaticity distance, the target chromaticity information.

7. The method of claim 6, wherein obtaining, by the electronic device based on the fifth correlated color temperature and the third chromaticity distance, the target chromaticity information comprises:
   adjusting a propensity of the fifth correlated color temperature to obtain a sixth correlated color temperature;
   adjusting a propensity of the third chromaticity distance to obtain a fourth chromaticity distance; and
   obtaining the target chromaticity information based on the sixth correlated color temperature and the fourth chromaticity distance.

8. The method of claim 6, wherein obtaining, by the AI automatic white balance module based on the image acquired by the camera, the fourth correlated color temperature and the second chromaticity distance comprises:
   outputting, by the AI automatic white balance module, the second correlated color temperature and an initial chromaticity distance based on the image acquired by the camera;
   correcting the second correlated color temperature and the initial chromaticity distance to obtain a corrected second correlated color temperature and a corrected initial chromaticity distance; and
   performing time series filtering based on the corrected second correlated color temperature and the corrected initial chromaticity distance to obtain the fourth correlated color temperature and the second chromaticity distance.

9. The method of claim 8, wherein performing time series filtering based on the corrected second correlated color temperature and the corrected initial chromaticity distance to obtain the fourth correlated color temperature and the second chromaticity distance comprises:

updating a first covariance matrix according to a formula $$Sigma'_1 = Sigma_1 + \lambda_1 * \begin{bmatrix} 1 & 0 \\ 0 & 1 \end{bmatrix},$$

to obtain an updated first covariance matrix, wherein Sigma$_1$' is the updated first covariance matrix, Sigma$_1$ is the first covariance matrix, $\lambda_1$ is a first parameter, and the first covariance matrix is either a) a covariance matrix output by the AI automatic white balance module based on the image acquired by the camera, or b) a covariance matrix calculated based on the second confidence level;

updating a second covariance matrix according to a formula $$Sigma'_2 = Sigma_2 + \lambda_2 * \begin{bmatrix} 1 & 0 \\ 0 & 1 \end{bmatrix},$$

to obtain an updated second covariance matrix, wherein the second covariance matrix is a covariance matrix of a second image, the second image is a previous frame of image acquired by the camera, Sigma$_2$' is the updated second covariance matrix, Sigma$_2$ is the second covariance matrix, and $\lambda_2$ is a second parameter;

obtaining a first filter vector by performing a calculation based on the corrected second correlated color temperature and the corrected initial chromaticity distance;

obtaining a second filter vector according to a formula Mu=Mu$_1$*(Sigma$_1$')$^{-1}$+Mu$_2$*(Sigma$_2$')$^{-1}$, wherein Mu$_1$ is the first filter vector, Mu$_2$ is a filter vector for the second image, and Mu is the second filter vector; and obtaining the fourth correlated color temperature and the second chromaticity distance by performing a calculation based on the second filter vector.

10. The method of claim 6, wherein merging, by the electronic device based on the second confidence level, the third correlated color temperature and the fourth correlated color temperature to obtain the fifth correlated color temperature comprises:

determining a first probability value based on a light value of the image acquired by the camera, the fourth correlated color temperature, and the second chromaticity distance; and calculating the fifth correlated color temperature according to a formula CCT$_5$=Conf_2*X'*CCT$_4$+(1−Conf_2*X')*CCT$_3$, wherein Conf_2 is the second confidence level, X' is the first probability value, CCT$_4$ is the fourth correlated color temperature, CCT$_3$ is the third correlated color temperature, and CCT$_5$ is the fifth correlated color temperature.

11. The method of claim 6, wherein merging, by the electronic device based on the second confidence level, the first chromaticity distance and the second chromaticity distance to obtain the third chromaticity distance comprises:

determining a second probability value based on a light value of the image acquired by the camera, the fourth correlated color temperature, and the second chromaticity distance; and calculating the third chromaticity distance according to a formula D$_{uv3}$=Conf_2*Y'*D$_{uv2}$+(1−Conf_2*Y')*D$_{uv1}$, wherein Conf_2 is the second confidence level, Y' is the second probability value, D$_{uv1}$ is the first chromaticity distance, D$_{uv2}$ is the second chromaticity distance, and D$_{uv3}$ is the third chromaticity distance.

12. The method of claim 7, wherein adjusting the propensity of the fifth correlated color temperature to obtain the sixth correlated color temperature comprises:

determining a first correlated color temperature adjustment value based on a light value of the image acquired by the camera, the fifth correlated color temperature, and the third chromaticity distance; and obtaining the sixth correlated color temperature according to a formula CCT$_6$=CCT$_5$+Delta_CCT', wherein CCT$_5$ is the fifth correlated color temperature, CCT$_6$ is the sixth correlated color temperature, and Delta_CCT' is the first correlated color temperature adjustment value.

13. The method of claim 7, wherein adjusting the propensity of the third chromaticity distance to obtain the fourth chromaticity distance comprises:

determining a first chromaticity distance adjustment value based on a light value of the image acquired by the camera, the fifth correlated color temperature, and the third chromaticity distance; and obtaining the fourth chromaticity distance according to a formula D$_{uv4}$=D$_{uv3}$+Delta_D$_{uv}$', wherein D$_{uv4}$ is the fourth chromaticity distance, D$_{uv3}$ is the third chromaticity distance, and Delta_D$_{uv}$' is the first chromaticity distance adjustment value.

14. An electronic device, comprising:
a processor;
a touchscreen coupled to the processor;
a camera coupled to the processor;
a multispectral sensor coupled to the processor, wherein a first channel of the multispectral sensor is configured to obtain a first channel value; and
a memory coupled to the processor, wherein the memory stores instructions that, when executed by the processor, cause the electronic device to be configured to:
start a camera application;
send the first channel value to an automatic white balance module configured to implement a plurality of algorithms;
select, by the automatic white balance module, a target algorithm from the plurality of algorithms based on the first channel value; and
determine, based on the target algorithm, target chromaticity information.

15. A non-transitory computer-readable storage medium, comprising instructions that, when executed by a processor of an electronic device, cause the electronic to be configured to:
start a camera application;
obtain, from a first channel of a multispectral sensor, a first channel value;
send the first channel value to an automatic white balance module configured to implement a plurality of algorithms;
select, by the automatic white balance module, a target algorithm from the plurality of algorithms based on the first channel value; and
determine, by the electronic device based on the target algorithm, target chromaticity information.

16. The electronic device of claim 14, wherein the multispectral sensor is configured to obtain first chromaticity information when the start is a cold start, and wherein the instructions, when executed by the processor, cause the electronic device to be configured to determine the target chromaticity information as being the first chromaticity information.

17. The electronic device of claim 14, wherein the first channel value comprises one or more of the following: a visible light channel value, a near-infrared (NIR) channel value, and a clear channel value.

18. The electronic device of claim 14, wherein the multispectral sensor is configured to obtain a first correlated color temperature and to send the first correlated color temperature to an artificial intelligence (AI) automatic white balance module, wherein the AI automatic white balance module is configured to determine a difference between the first correlated color temperature and a second correlated color temperature, wherein the second correlated color temperature is a correlated color temperature value obtained by the AI automatic white balance module based on an image acquired by the camera, and wherein the instructions, when executed by the processor, cause the electronic device to be configured to:
 adjust a confidence level output by the AI automatic white balance module to a first confidence level when the difference is greater than a preset threshold; and
 determine, based on the first confidence level, target chromaticity information.

19. The electronic device of claim 18, wherein the instructions, when executed by the processor, cause the electronic device to be configured to determine that the target chromaticity information is second chromaticity information when the automatic white balance module or the AI automatic white balance module determines that the image acquired by the camera is a solid-color image, wherein the second chromaticity information is chromaticity information obtained by the multispectral sensor.

20. The electronic device of claim 18, wherein determining target chromaticity information based on the first confidence level comprises:
 performing, by the automatic white balance module by using the target algorithm, calculation on the image acquired by the camera, to obtain a third correlated color temperature and a first chromaticity distance;
 obtaining, by the AI automatic white balance module based on the image acquired by the camera, a fourth correlated color temperature and a second chromaticity distance;
 correcting, by the electronic device, the first confidence level to obtain a second confidence level;
 merging, by the electronic device based on the second confidence level, the third correlated color temperature and the fourth correlated color temperature to obtain a fifth correlated color temperature;
 merging, by the electronic device based on the second confidence level, the first chromaticity distance and the second chromaticity distance to obtain a third chromaticity distance; and
 obtaining, by the electronic device based on the fifth correlated color temperature and the third chromaticity distance, the target chromaticity information.

* * * * *